Oct. 24, 1950     D. BELCHER ET AL     2,527,295
APPARATUS FOR MANUFACTURING VALVE BAGS
Filed June 25, 1947     22 Sheets-Sheet 1

Oct. 24, 1950      D. BELCHER ET AL      2,527,295
APPARATUS FOR MANUFACTURING VALVE BAGS
Filed June 25, 1947      22 Sheets-Sheet 2

Daniel Belcher,
Russell J. Williams,
James E. Voege,
Inventors,
Haynes and Koenig,
Attorneys.

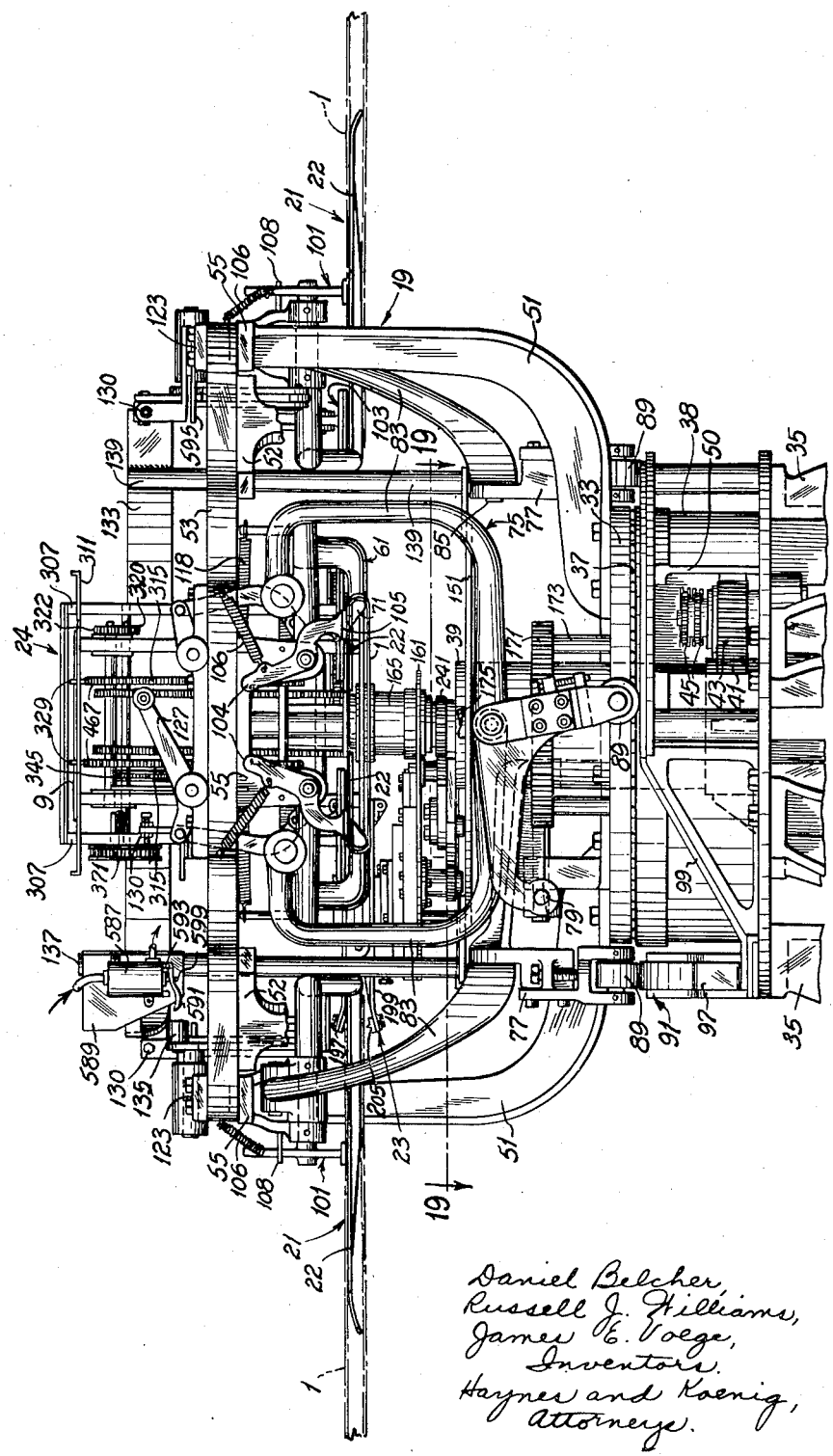

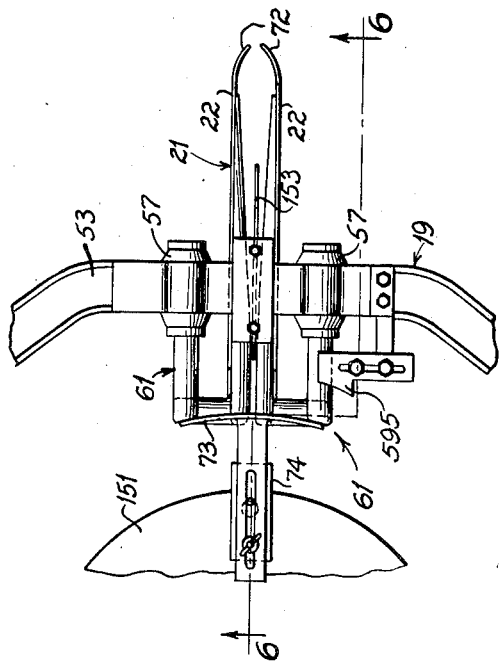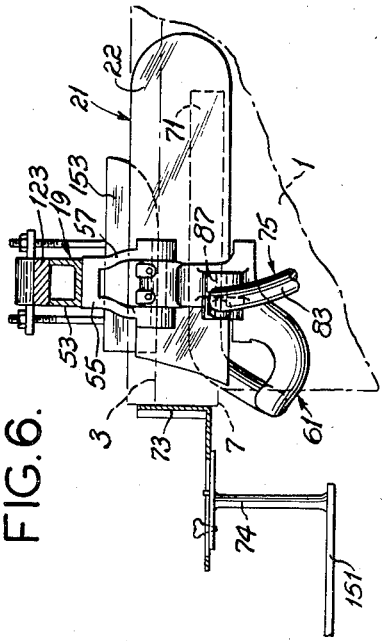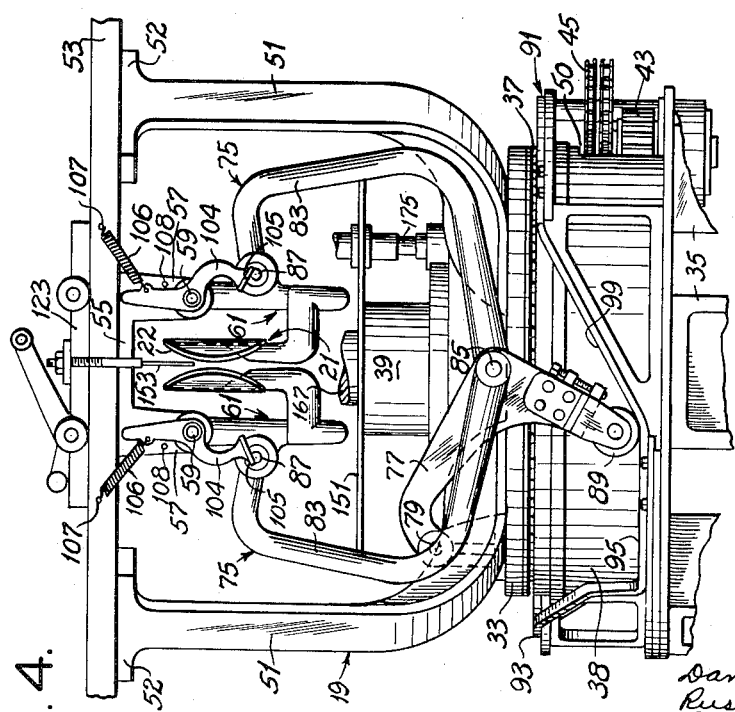

Oct. 24, 1950     D. BELCHER ET AL     2,527,295
APPARATUS FOR MANUFACTURING VALVE BAGS
Filed June 25, 1947     22 Sheets-Sheet 5

Daniel Belcher,
Russell J. Williams,
James E. Voege,
Inventors.
Haynes and Koenig,
Attorneys.

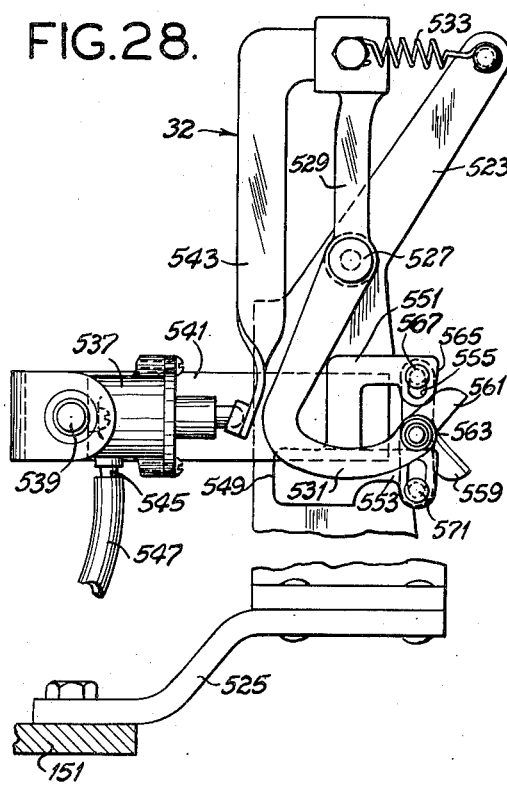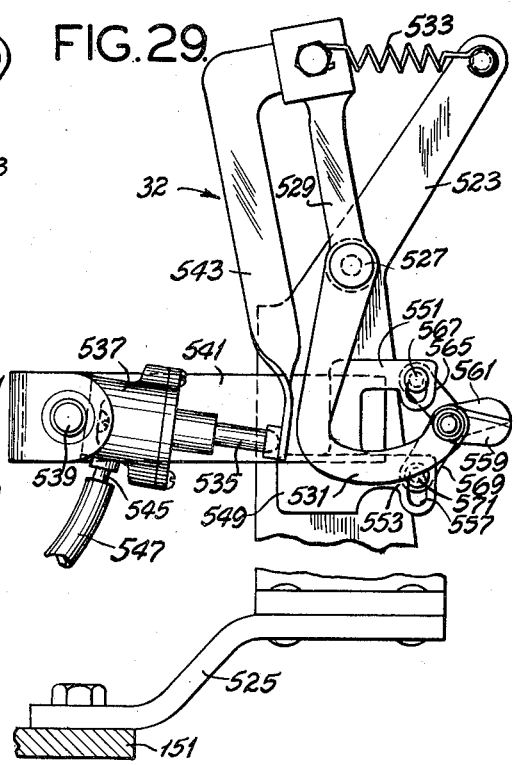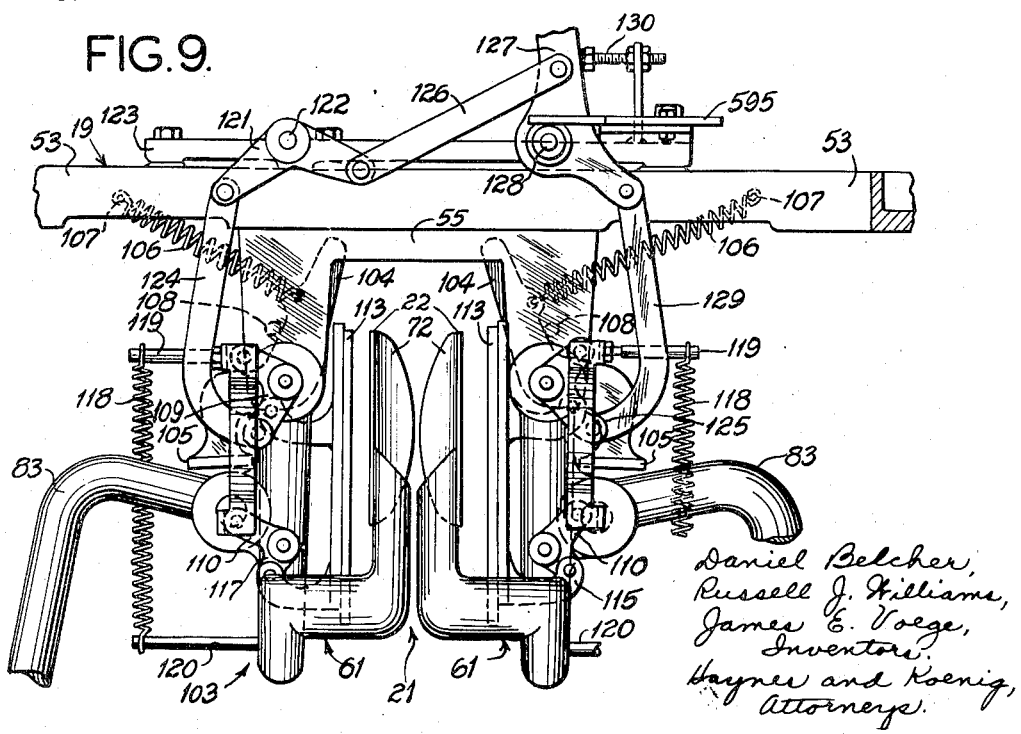

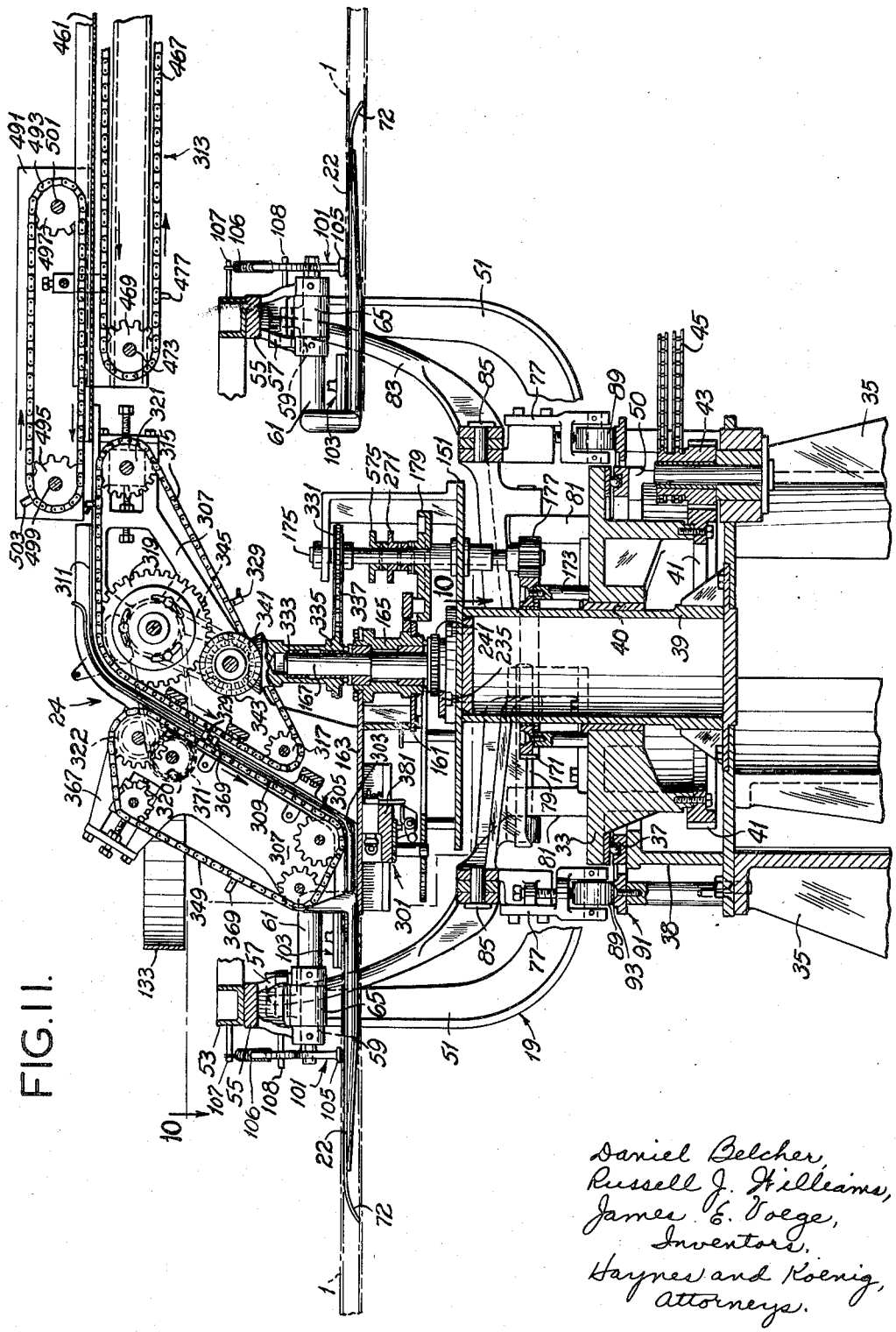

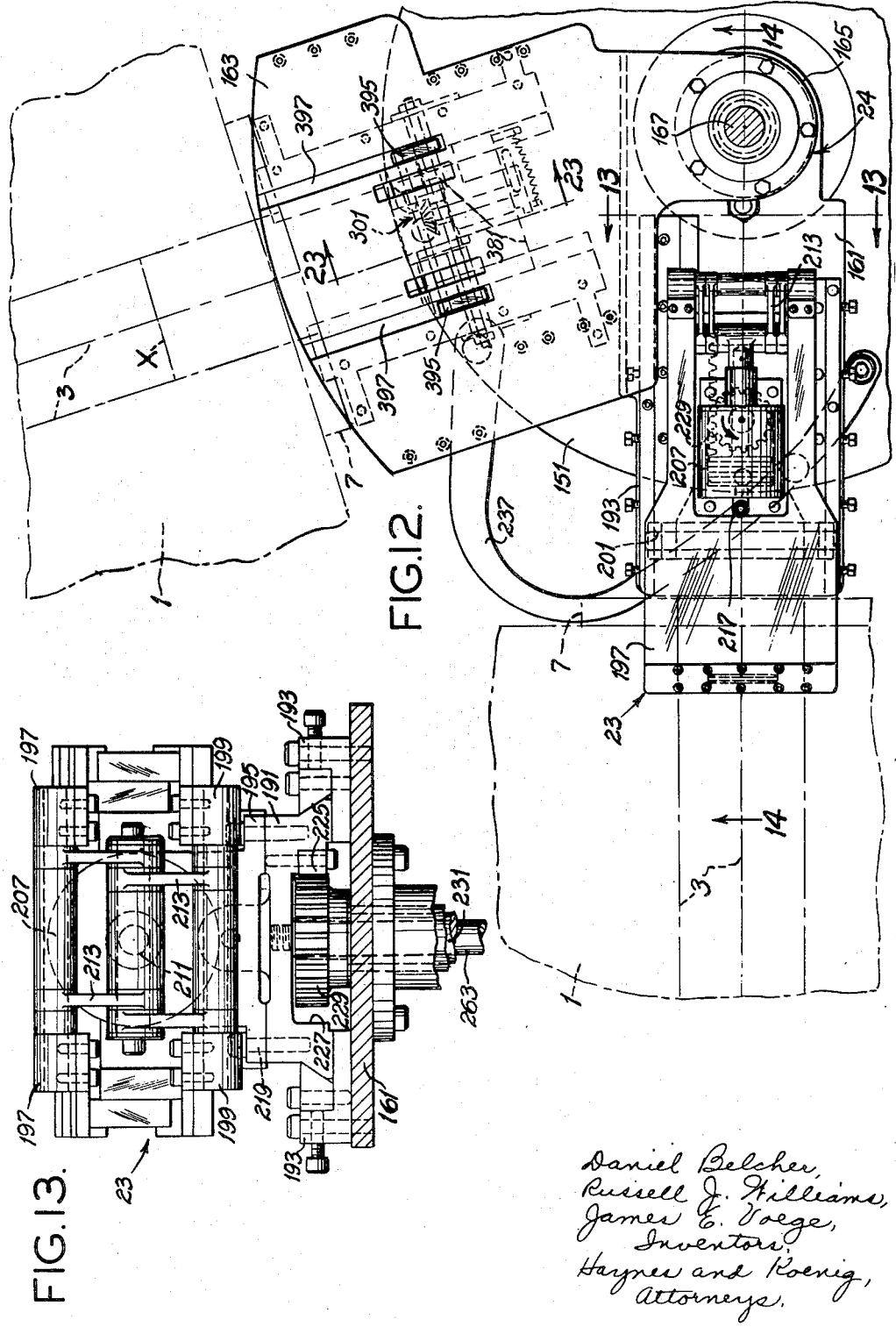

Oct. 24, 1950 D. BELCHER ET AL 2,527,295
APPARATUS FOR MANUFACTURING VALVE BAGS
Filed June 25, 1947 22 Sheets-Sheet 10

Daniel Belcher,
Russell J. Williams,
James E. Voege,
Inventors.
Haynes and Koenig,
Attorneys.

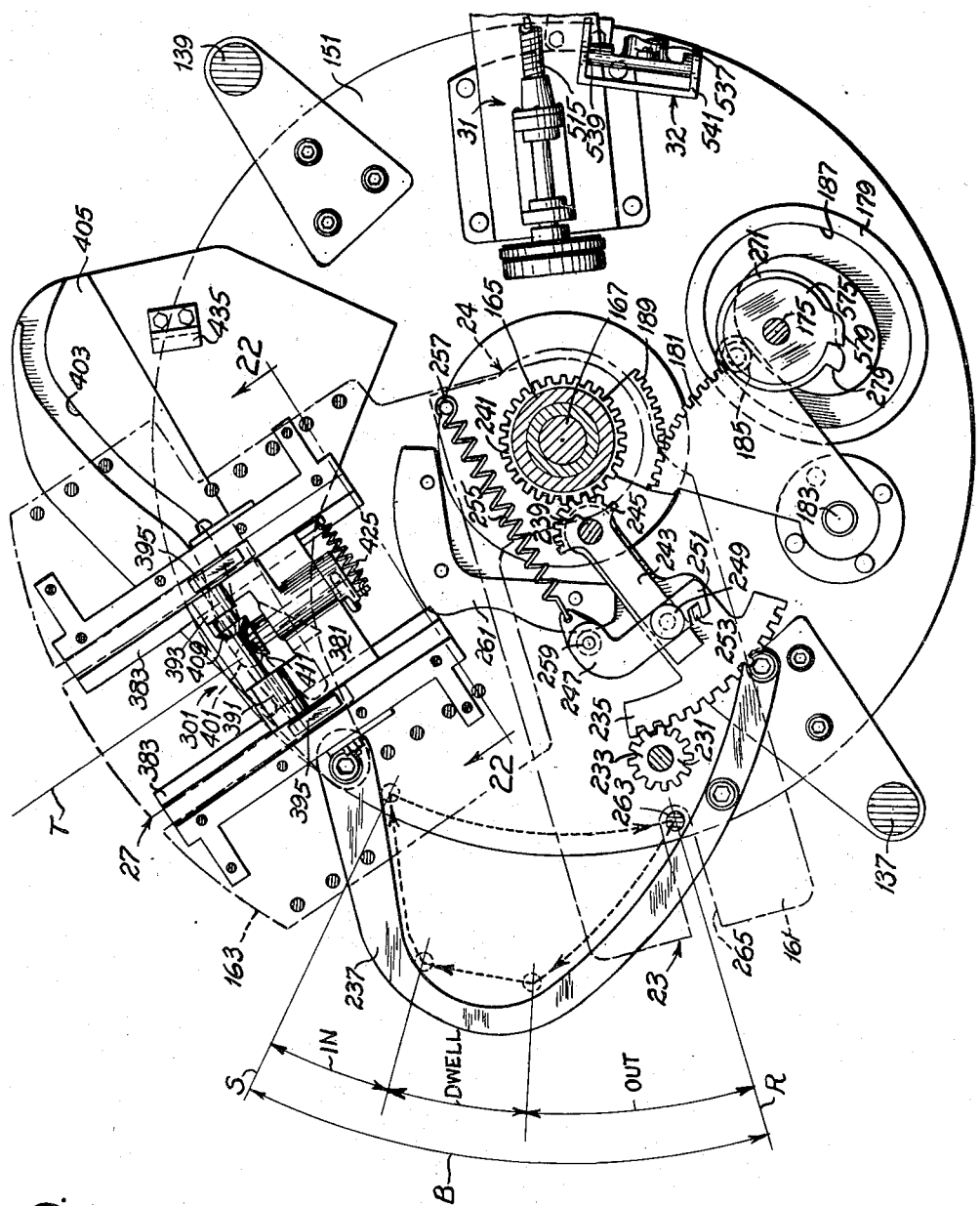

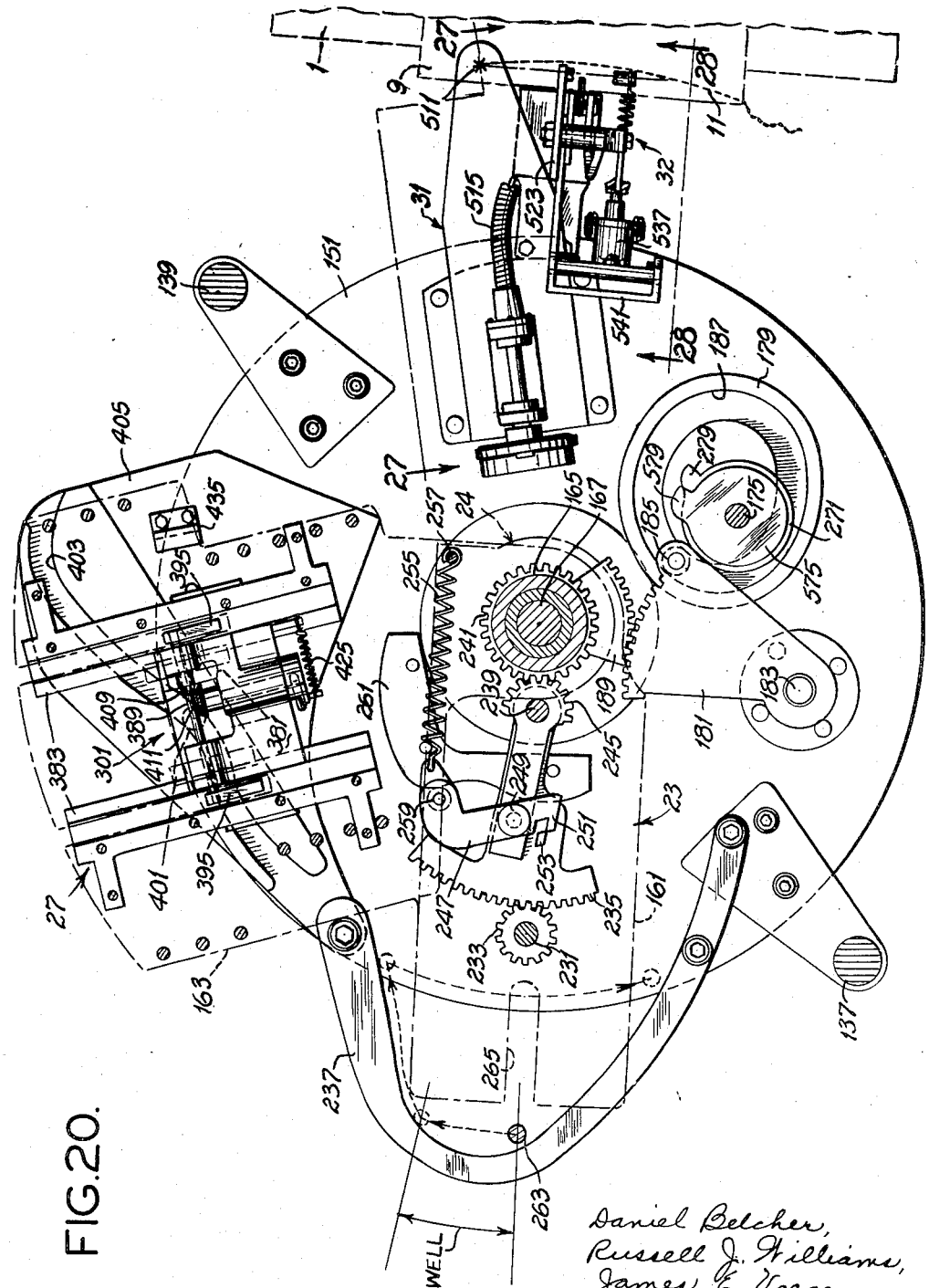

Oct. 24, 1950 D. BELCHER ET AL 2,527,295
APPARATUS FOR MANUFACTURING VALVE BAGS
Filed June 25, 1947 22 Sheets-Sheet 13

Daniel Belcher,
Russell J. Williams,
James E. Voege,
Inventors.
Haynes and Koenig,
Attorneys.

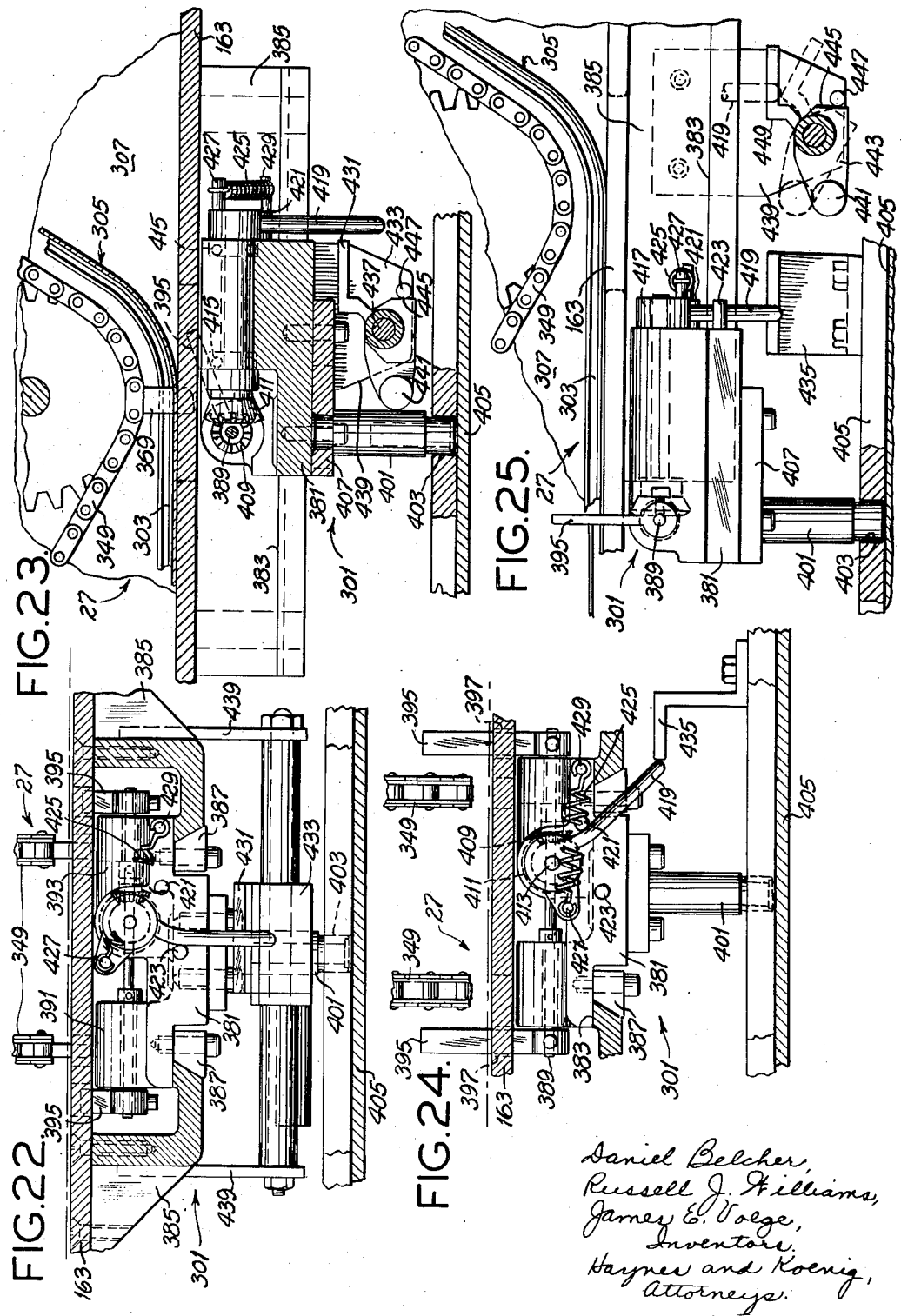

Oct. 24, 1950     D. BELCHER ET AL     2,527,295
APPARATUS FOR MANUFACTURING VALVE BAGS
Filed June 25, 1947     22 Sheets-Sheet 15

Daniel Belcher,
Russell J. Williams,
James E. Voege,
Inventors.
Haynes and Koenig,
Attorneys.

Oct. 24, 1950   D. BELCHER ET AL   2,527,295
APPARATUS FOR MANUFACTURING VALVE BAGS
Filed June 25, 1947   22 Sheets-Sheet 16
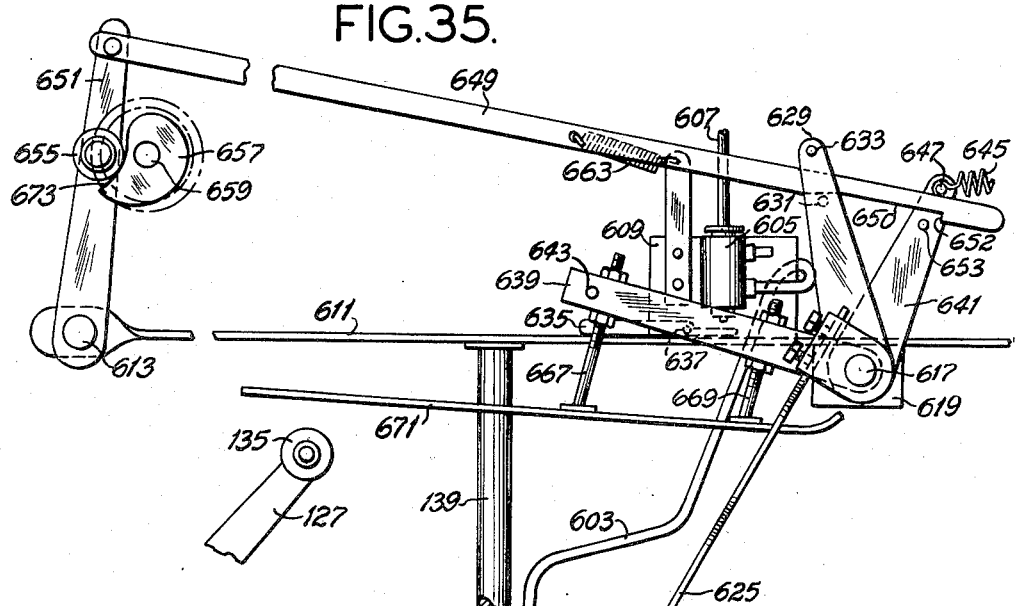
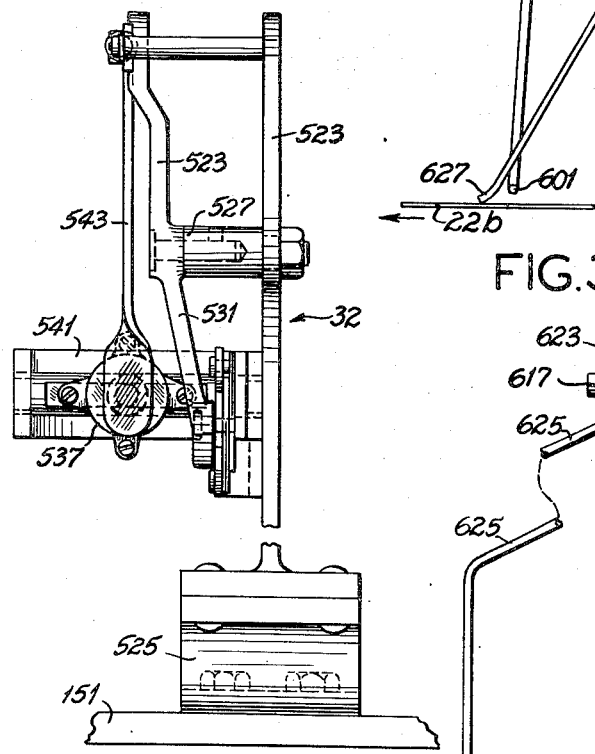
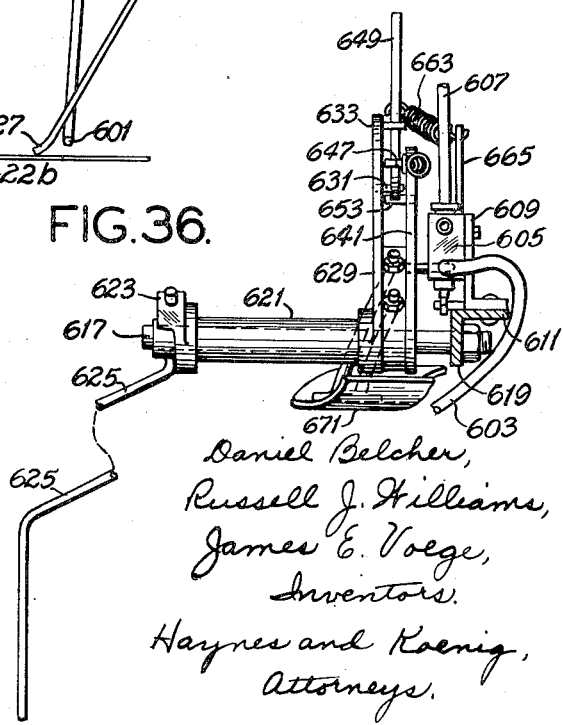

Oct. 24, 1950         D. BELCHER ET AL         2,527,295
APPARATUS FOR MANUFACTURING VALVE BAGS
Filed June 25, 1947                      22 Sheets-Sheet 17
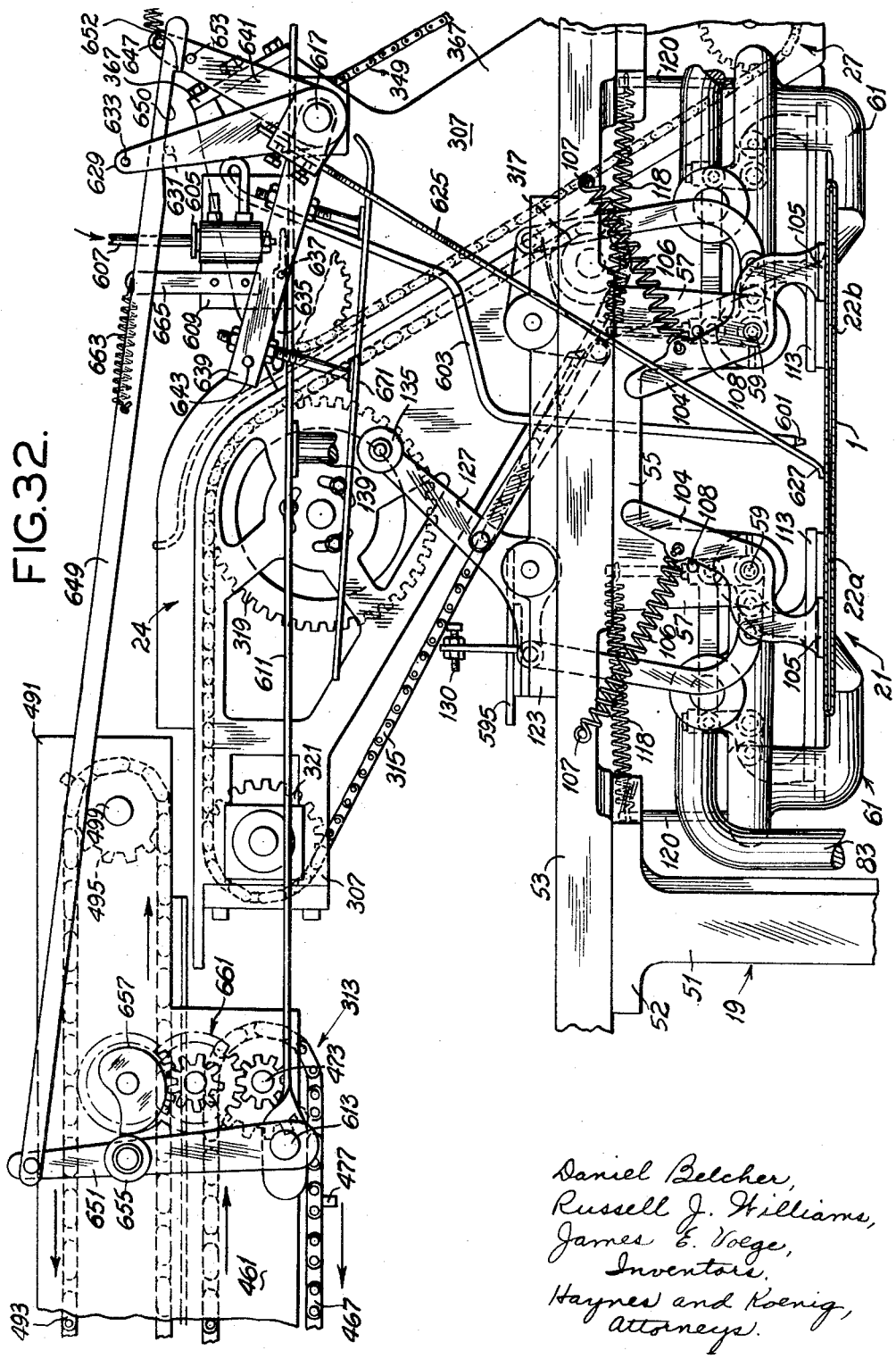
Daniel Belcher,
Russell J. Williams,
James E. Voege,
   Inventors.
Haynes and Koenig,
   Attorneys.

Oct. 24, 1950     D. BELCHER ET AL     2,527,295
APPARATUS FOR MANUFACTURING VALVE BAGS
Filed June 25, 1947     22 Sheets-Sheet 18

Daniel Belcher,
Russell J. Williams,
James E. Voege,
Inventors.
Hayner and Koenig,
Attorneys.

Oct. 24, 1950     D. BELCHER ET AL     2,527,295
APPARATUS FOR MANUFACTURING VALVE BAGS
Filed June 25, 1947     22 Sheets-Sheet 19
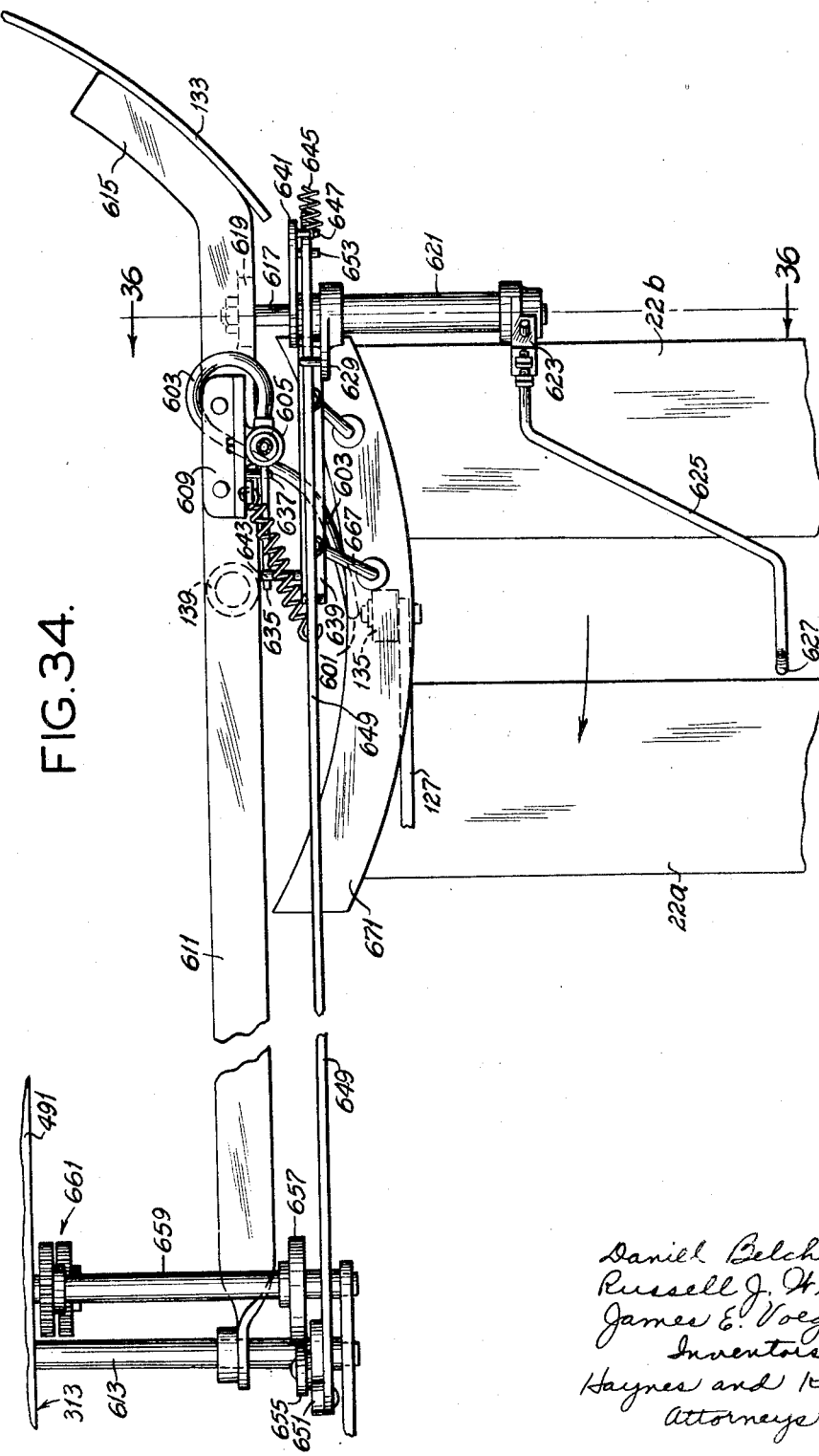

Oct. 24, 1950     D. BELCHER ET AL     2,527,295
APPARATUS FOR MANUFACTURING VALVE BAGS
Filed June 25, 1947     22 Sheets-Sheet 20
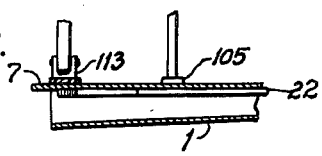
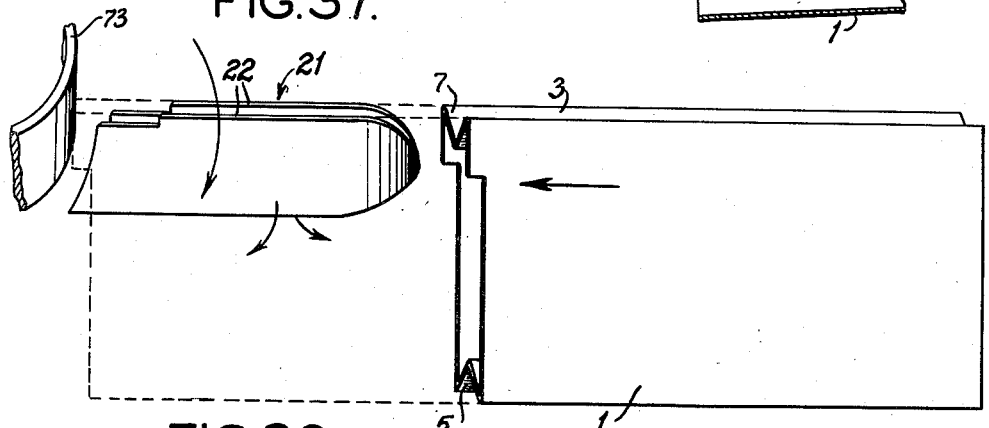
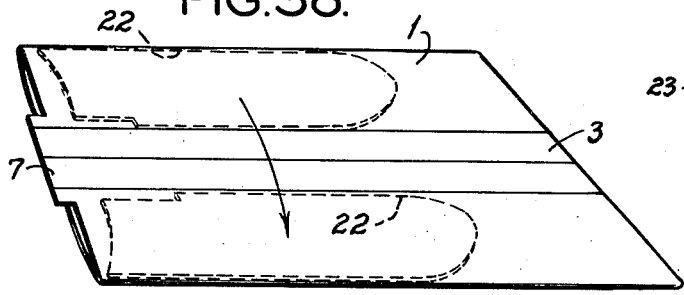
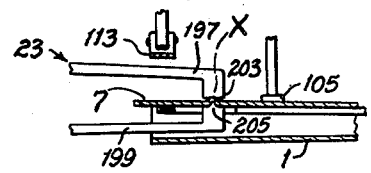
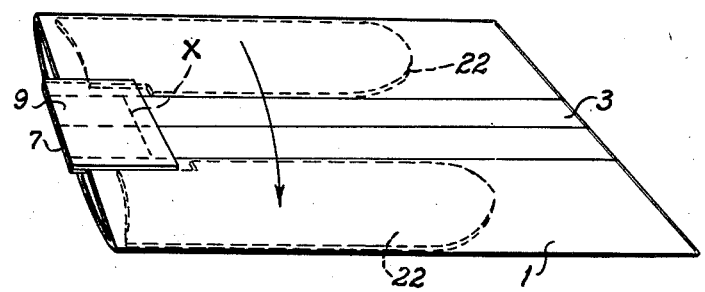
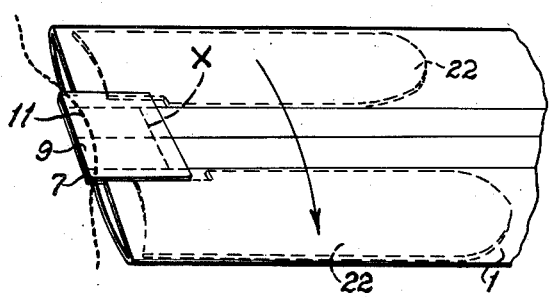
Daniel Belcher,
Russell J. Williams,
James E. Voege,
Inventors,
Haynes and Koenig,
Attorneys.

Oct. 24, 1950    D. BELCHER ET AL    2,527,295
APPARATUS FOR MANUFACTURING VALVE BAGS
Filed June 25, 1947    22 Sheets-Sheet 21

Daniel Belcher,
Russell J. Williams,
James E. Voege,
Inventors.
Haynes and Koenig,
Attorneys.

Oct. 24, 1950  D. BELCHER ET AL  2,527,295
APPARATUS FOR MANUFACTURING VALVE BAGS
Filed June 25, 1947  22 Sheets-Sheet 22
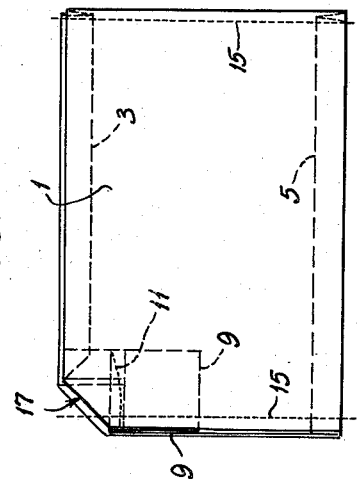
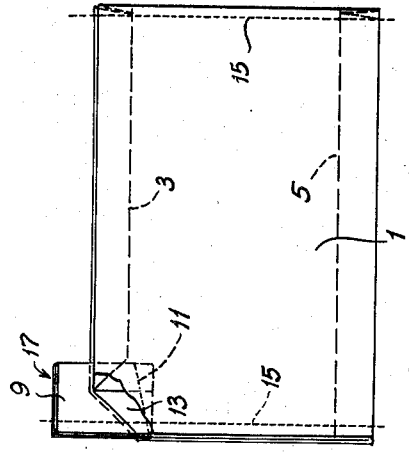
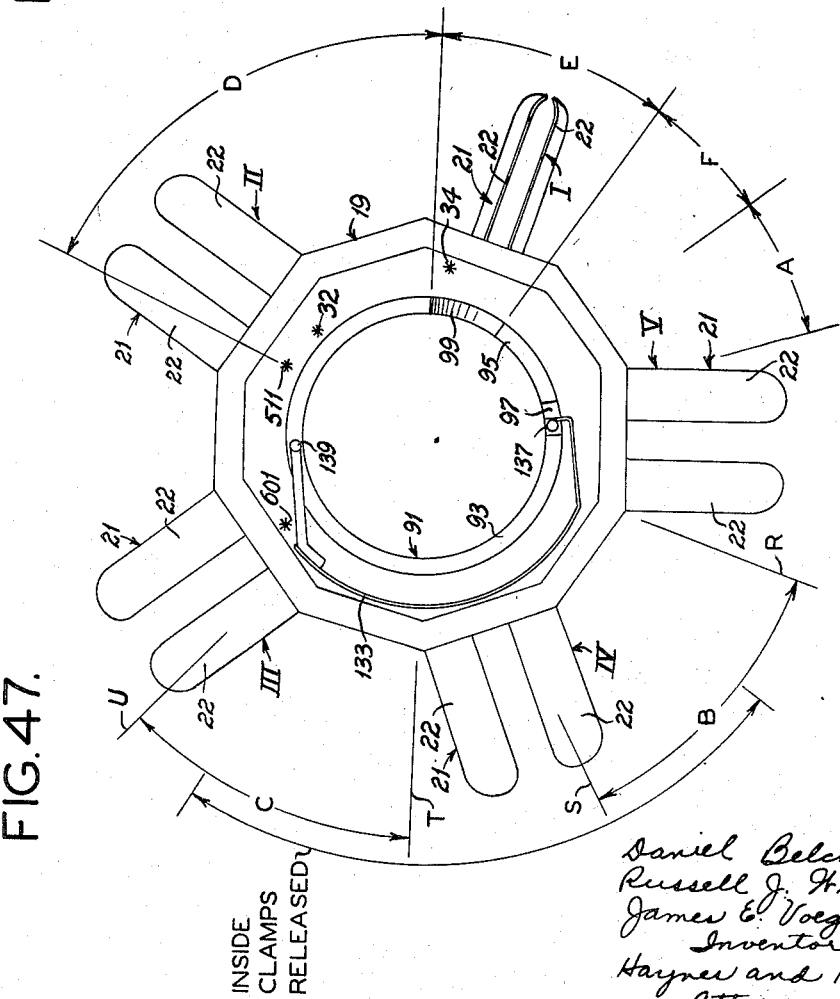
Daniel Belcher,
Russell J. Williams,
James E. Voege,
Inventors.
Haynes and Koenig,
Attorneys.

Patented Oct. 24, 1950

2,527,295

UNITED STATES PATENT OFFICE 2,527,295

APPARATUS FOR MANUFACTURING VALVE BAGS

Daniel Belcher, Minneapolis, Minn., Russell J. Williams, Richmond Heights, Mo., and James E. Voege, Alton, Ill., assignors to Bemis Bro. Bag Company, St. Louis, Mo., a corporation of Missouri Application June 25, 1947, Serial No. 756,998

38 Claims. (Cl. 93—8)

This invention relates to apparatus for manufacturing valve bags and, more particularly, to apparatus for continuous production of valve bag bodies of the type having a valve sleeve affixed at a corner.

Among the several objects of the invention may be noted the provision of apparatus for manufacturing valve bag bodies of the type described, wherein valve sleeves are automatically assembled with and fastened to bag bodies in a continuous operation; the provision of apparatus of the class described adapted to have valve sleeves and bag bodies supplied separately and adapted automatically to assemble the valve sleeves with the bag bodies in proper position for affixation; the provision of apparatus of this class wherein the valve sleeves are automatically fastened to the bag bodies after assembly at a corner, as by stitching; the provision of apparatus of this class adapted particularly for operation upon bag bodies having gusset sides; and, generally, the provision of apparatus such as described adapted effectively and reliably to produce valve bag bodies at high speeds and in quantity with the only manual operations necessary being the simple operations of supplying valve sleeves and bag bodies thereto and the removal of completed valve bag bodies therefrom. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a side elevation of the apparatus of this invention;

Fig. 3 is an enlarged vertical section taken substantially on line 3—3 of Fig. 1, illustrating a rotatable carriage of the apparatus in a different angular position from that of Figs. 1 and 2, and showing in full end elevation an expanded bag-spreading device of the apparatus;

Fig. 4 is an enlarged fragmentary elevation as viewed in the direction of the arrow 4 in Fig. 2, illustrating in full end elevation a collapsed bag-spreading device of the apparatus;

Fig. 5 is a plan view of Fig. 4;

Fig. 6 is a vertical section taken substantially on line 6—6 of Fig. 5;

Fig. 9 is a view corresponding to Fig. 8, but showing the bag-spreading device collapsed and the clamping devices released;

Fig. 11 is an enlarged vertical section taken substantially on line 11—11 of Fig. 2;

Fig. 12 is a fragmentary horizontal section, illustrating a creasing device and a valve sleeve delivery device in plan;

Fig. 13 is a transverse vertical section taken substantially on line 13—13 of Fig. 12, illustrating the creasing device in end elevation;

Fig. 19 is an enlarged horizontal section taken substantially on line 19—19 of Fig. 3, and illustrating parts in an initial position;

Fig. 20 is a section similar to Fig. 19, showing parts in an intermediate position;

Fig. 22 is a transverse vertical section of the valve sleeve delivery device, taken on line 22—22 of Fig. 19;

Fig. 23 is a longitudinal vertical section of the valve sleeve delivery device, taken on line 23—23 of Fig. 12;

Fig. 24 is a transverse section similar to Fig. 22, illustrating parts in a different position;

Fig. 25 is a view similar to Fig. 23, illustrating parts in the position of Fig. 24;

Fig. 27 is a vertical section taken substantially on line 27—27 of Fig. 20, illustrating a sewing machine in side elevation;

Fig. 28 is a vertical section, taken substantially on line 28—28 of Fig. 20, illustrating a cutter in side elevation;

Fig. 29 is a vertical section similar to Fig. 28, illustrating the blades of the cutter of Fig. 28 closed;

Fig. 30 is an end elevation of the cutter of Figs. 28 and 29;

Fig. 32 is an enlarged side elevation of that side of the apparatus which is uppermost in Fig. 2, illustrating a valve sleeve ejecting means;

Fig. 34 is a plan view of the valve sleeve ejecting means;

Fig. 35 is a side elevation of the valve sleeve ejecting means, similar to Fig. 32 but illustrating parts in a different position;

Fig. 36 is a vertical section taken substantially on line 36—36 of Fig. 34;

Figs. 37-46 are diagrammatic views consecutively illustrating steps in the operation of the apparatus of this invention;

Fig. 47 is a phase diagram illustrating the phase relationship of certain mechanisms of the apparatus of this invention;

Fig. 48 is a perspective view illustrating one form of valve bag which may be manufactured with the apparatus of this invention; and, Fig. 49 is a perspective view illustrating another form of valve bag which may be produced with the apparatus of this invention.

Figure 1:
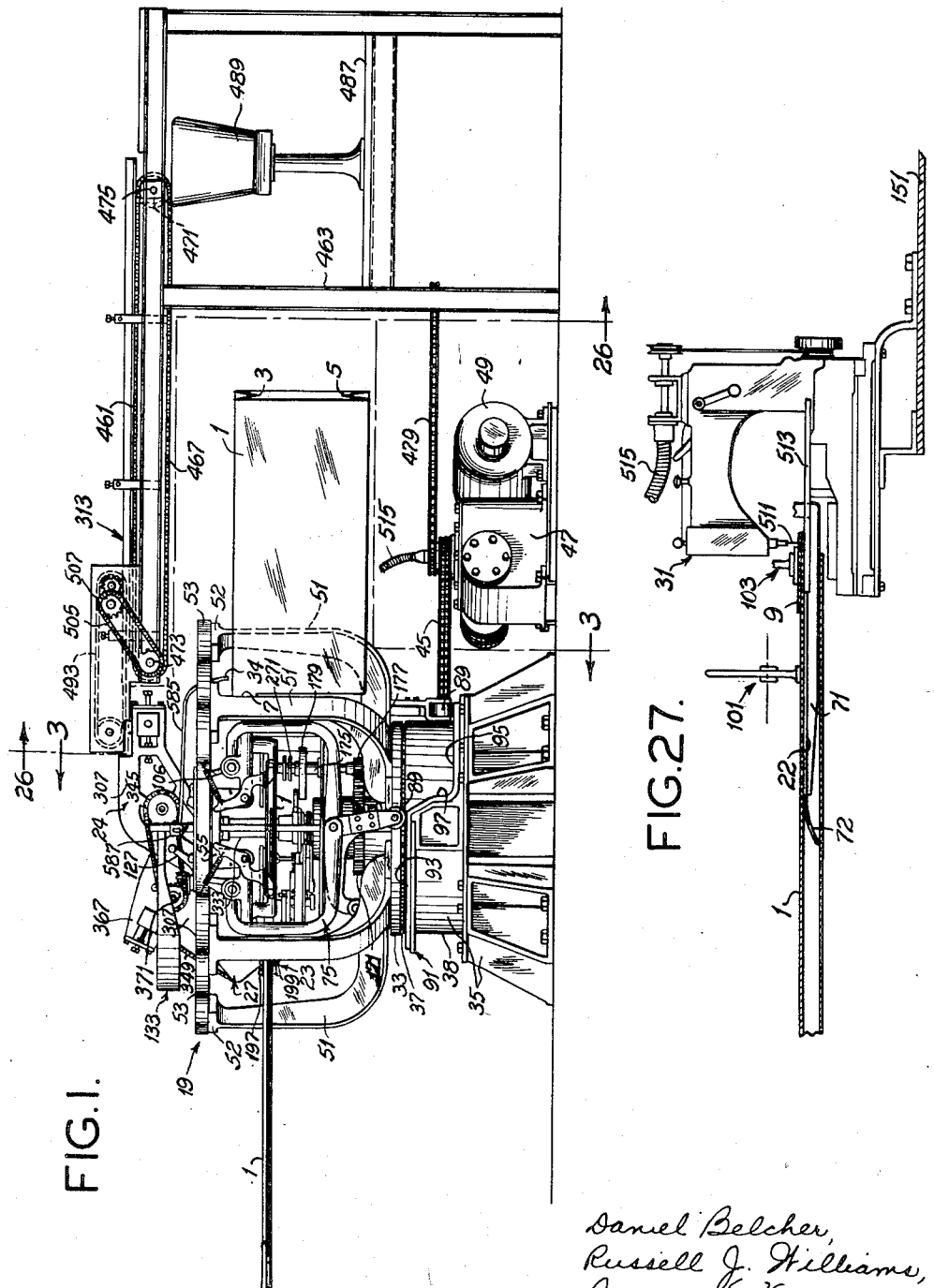

Similar reference characters indicate corresponding parts throughout the several views of the drawings. It will be understood that parts have been omitted in certain figures so as not to obscure other parts. Fig. 3 at the upper left illustrates in full elevation certain air valve parts that would otherwise be partially out of the plane of view.

General features

Figure 45:
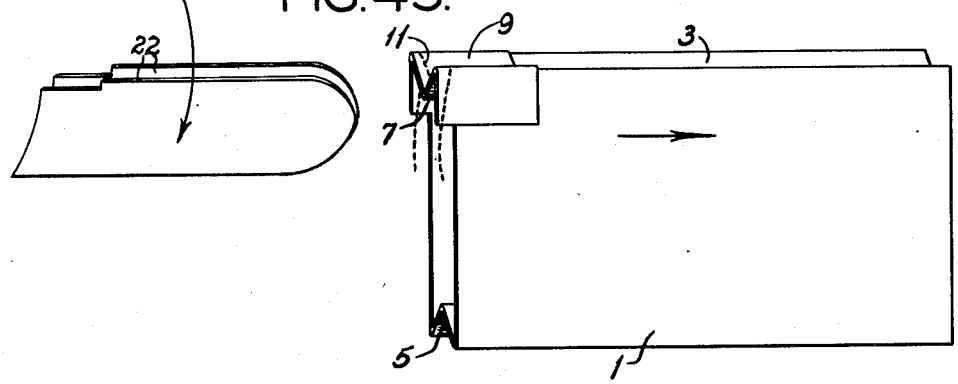

The ultimate function of the apparatus of this invention is the automatic, high-speed production of the valve bag body illustrated in Fig. 45. This valve bag body comprises a bag body 1 in the form of a flattened tube of sheet material, such as paper, fabric or the like, having infolded gusset sides 3 and 5. Extending outward from a corner of the bag body, specifically the corner at the mouth end of the side 3, is an extension or tongue 7. A valve sleeve 9 is affixed to the extension 7 as by stitching 11. The valve sleeve is simply a rectangular piece of sheet material, preferably paper, which is stitched to the bag body on the outside thereof with one of its long sides substantially coincidental with the outer edge of the extension 7.

By way of explanation, the valve bag body above described is ultimately formed into a valve bag such as illustrated in Fig. 48 by tucking in the aforesaid corner of the bag body to form a valve flap 13 extending into the bag body with the valve sleeve 9 forming what is known in the art as a "tuck-in sleeve" extending outward beyond the side of the bag body. The ends of the bag body are closed as by stitched seams 15 or the equivalent, thus forming a completed valve bag having an inlet 17 between the sides of the folded valve sleeve 9 and valve flap 13. This bag is adapted to be filled with comminuted or pulvurulent material by inserting a filling spout through the inlet. When the bag is filled, a closure for the inlet is provided by crumpling up the tuck-in sleeve and tucking it into the inlet.

Alternately, the valve bag body above described may be formed into the valve bag illustrated in Fig. 49 by tucking in the corner of the bag to form the valve flap 13 and by folding the valve sleeve 9 upon itself so that it extends into the bag instead of outward. In this case, closure of the inlet 17 is effected by the crumpling up of the sleeve under the pressure of the material filling the bag.

Generally, and referring more particularly to Figs. 2 and 37-47, the apparatus of this invention for forming the valve bag body illustrated in Fig. 45 includes a conveyor 19 in the form of a generally annular carriage which rotates continuously about a central vertical axis. Extending generally radially outward from the carriage 19 are a plurality of bag-spreading devices, each designated 21. Each one of these devices comprises a pair of blades 22 pivotally mounted on the carriage in such manner that they may be collapsed to receive a bag body and expanded to spread it. As illustrated herein, there are five bag-spreading devices, spaced uniformly around the carriage, but it will be understood that this number is arbitrary and that there may be more or less than five such devices.

Each pair of blades is adapted to have a bag body 1 placed thereon as it rotates through a zone A (Fig. 47), and to carry the bag body successively through a number of zones wherein different operations are automatically performed. As the blades 22 rotate through zone A, they are maintained in collapsed position. This enables an operator readily to slip a bag body 1 on each pair of blades since it is merely necessary to open up the flattened tubular bag body sufficiently to permit entry of the blades therein. This operation is illustrated in Fig. 37.

As any pair of blades carrying a bag body rotates with carriage 19 out of zone A, the blades are moved by means to be described from the collapsed position of Fig. 37 to the expanded position of Fig. 38, thereby spreading the bag horizontally and spreading flat its gusset side 3. Also, the spread bag body is clamped upon the blades by clamping devices, to be described, which engage the upper surfaces of the bag body resting upon the blades to hold it firmly in position thereon, as illustrated in Fig. 39.

The pair of blades subsequently rotates through operating zone B (Fig. 47). During the interval in which the blades rotate through this zone, a creasing device, generally designated 23, carried by a turret generally designated 24 which oscillates within carriage 19, moves into position to form a valve flap crease X across the gusset 3 of the bag body (Fig. 40). The turret 24 is adapted to rotate in unison with carriage 19 from an initial position through a fraction of one revolution, then to return rapidly to the initial position. The creasing device is adapted to reciprocate between a retracted position inward from the blades 22 (Figs. 2 and 14), and an operating position (Fig. 15) wherein creasing dies form the crease. This crease is formed to establish the fold line upon which the valve flap 17 is subsequently folded and tucked in.

The blades subsequently carry the spread bag body through operating zone C wherein a valve sleeve 9 is delivered upon the upper surface of the bag body with a long side thereof coincidental with the outer edge of the bag body extension 7. The resultant valve sleeve and bag body assembly is illustrated in Fig. 41. The sleeve is delivered to the bag body by a delivery means 27 carried by the oscillating turret 24. During the delivery of the sleeve, certain of the aforesaid clamping devices are released to permit the sleeve to be fed outward over the upper surface of the bag body. After the sleeve has been delivered, said clamping devices are returned to clamping position firmly to clamp the sleeve upon the bag body.

Figure 43:
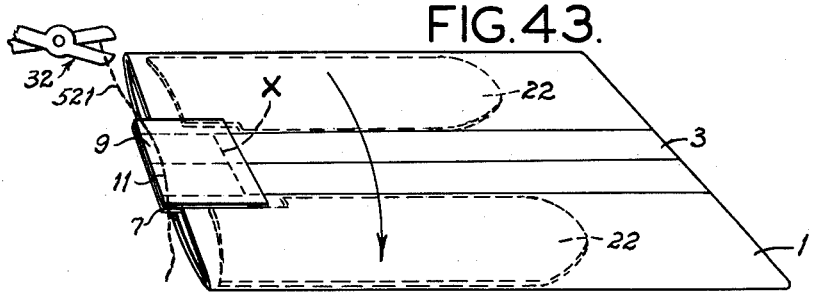

The blades thereupon carry the assembled valve sleeve and bag body through operating zone D wherein they travel across the platen of a sewing machine 31, thereby forming the stitching 11 securing the sleeve to the tongue 7 (Fig. 42). After the tongue 7 and valve sleeve 9 have been stitched and travel past the sewing machine, a cutter 32 operates to sever the stitching cord (Fig. 43).

Figure 44:
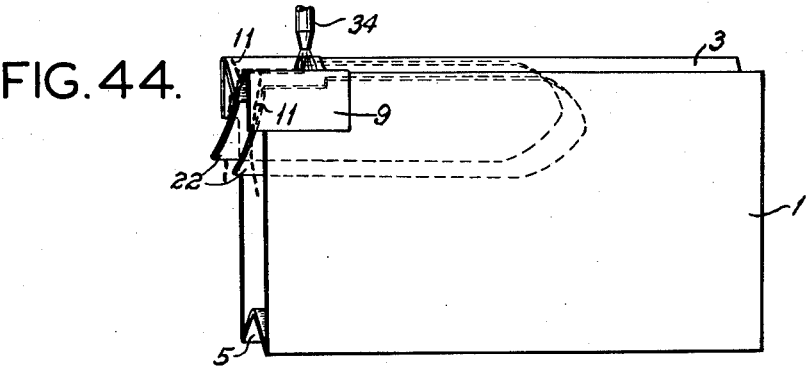

The blades then carry the bag body 1 with valve sleeve 9 stitched thereto through operating zone E, wherein the blades are moved back to collapsed position to restore the tubular bag body to its original form with sides 3 and 5 folded in. In this zone a blast of air is delivered from a nozzle 34 against the sleeve to insure that it is folded in with the infolded gusset side 3, as illustrated in Fig. 44.

Finally, the blades carry the bag through operating zone F, where the completed valve bag body is manually stripped from the blades (Fig. 45). The collapsed blades then re-enter zone A, where another bag body is placed thereon and the entire series of operations repeated. It will be understood that, since there are five pairs of blades, five bag bodies are in the process of having valve sleeves applied thereto during each revolution of carriage 19.

*The carriage, bag-spreading and clamping devices*

Referring more particularly to Figs. 1-11, the conveyor or carriage 19 comprises a casting 33 supported for rotation about a vertical axis upon a base 35. The carriage rides on an elevated horizontal annular thrust bearing 37. The latter is supported upon a cylindric wall 38 forming part of base 35. A post 39 extends vertically upward from base 35 through a central aperture in the casting 33, which is journalled for rotation about the post on a sleeve 40 (Fig. 11). An annular ring gear 41 is fixed upon the bottom of the casting. A continuously driven spur gear 43, carried by the base 35, meshes with ring gear 41 to rotate casting 33 and the carriage 19 continuously at a relatively low speed. Spur gear 43 is driven by means of a chain and sprocket drive 45 from the vertical output shaft of a speed reducer 47, which in turn is continuously driven by a motor 49. The cylindric wall 38 has a gap 50 to accommodate the spur gear 43 and the chain and sprocket drive 45.

Arms 51 extend outward and upward from casting 33 of the carriage 19. As illustrated herein, there are five such arms spaced uniformly around the carriage, with their lower ends secured to the casting 33 and their upper ends formed with heads 52. Channel bars 53 bridge the spaces between the upper ends of adjacent arms, being secured at their ends to the heads 52. Between adjacent arms the channel bars carry bearing brackets 55 secured to the bottom of the bars. There are five such brackets 55, each of which supports the two blades 22 of one of the bag-spreading devices 21 for pivotal movement between collapsed and expanded positions.

Figure 7:
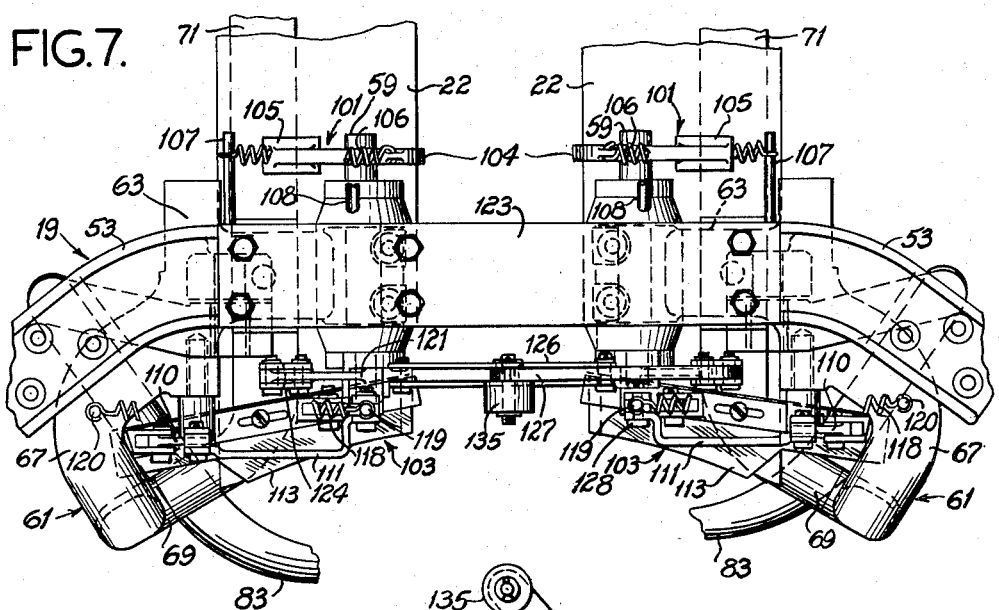
Fig. 7 is an enlarged fragmentary plan view detailing a bag-spreading device and clamping devices associated therewith, the bag-spreading device being expanded and the clamping devices engaged.
Figure 8:
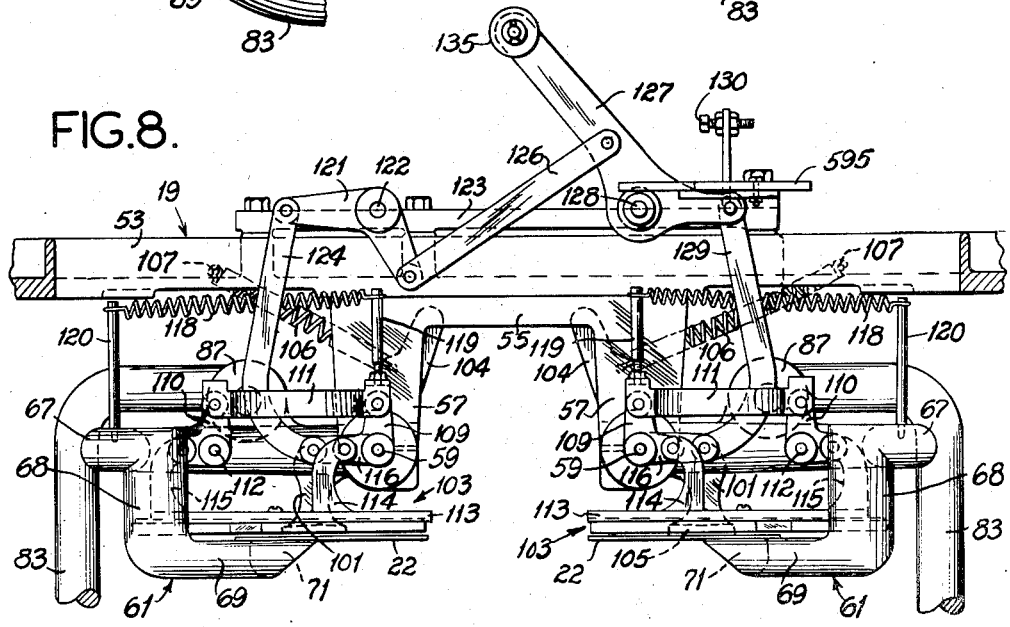
Fig. 8 is a fragmentary elevation of Fig. 7, viewed from within the rotatable carriage.
Figure 10:
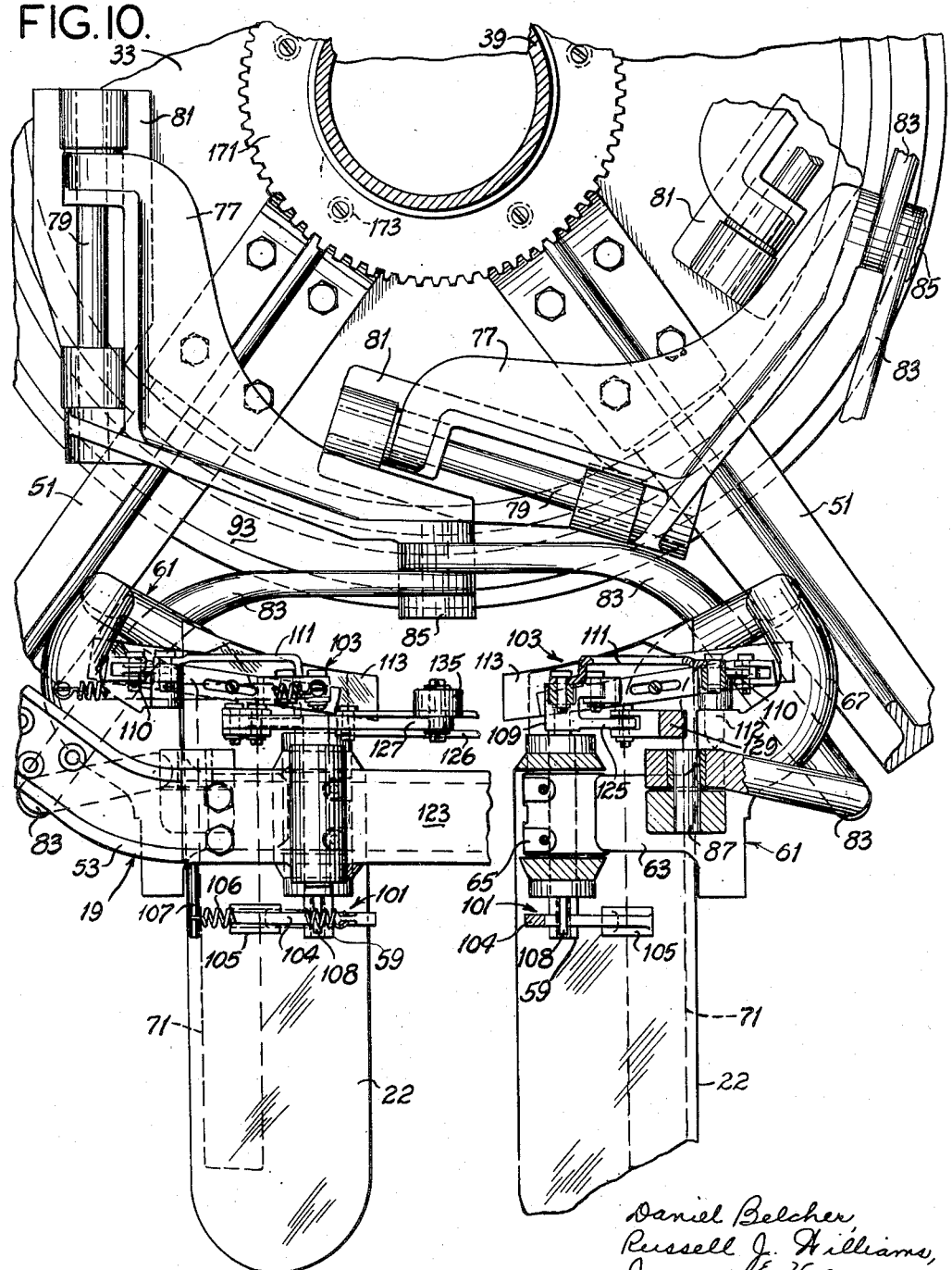
Fig. 10 is an enlarged horizontal section taken substantially on line 10—10 of Fig. 11.

Each bracket is formed with a pair of transversely spaced depending clevises 57. A shaft 59 is journalled in the lower end of each clevis. The pair of shafts 59 carried by a bracket 55 are parallel and extend generally radially of the carriage. On each shaft 59 is fixed a blade-carrying casting 61. This casting has a crank 63 fixed at 65 to the respective shaft 59 (Fig. 10). A curved arm 67 extends generally inward toward the center of the carriage from the outer end of the crank 63 (Figs. 7, 8 and 10). Arm 67 has a depending portion 68, the latter having a lateral extension 69. A tapered finger 71 extends generally radially outward from the end of extension 69 beyond the carriage arms 51. Each finger 71 carries a blade 22, the plane of each blade being parallel to and offset from the axis of its respective shaft 59. The axes of the blades are parallel and spaced apart a distance somewhat greater than the sum of the distances by which the blades are offset from their respective axes.

The above arrangement is such that the pair of blades 22 of each bag-spreading device may pivot on their respective axes between the collapsed, vertical, closely spaced position of Fig. 9, and the expanded, horizontal, coplanar, widely spaced position of Fig. 8. With the pair of blades 22 in the collapsed position of Fig. 9, a bag body may be readily placed thereon simply by opening the mouth of the bag body a small amount and slipping it on the blades. The outer ends of the blades are preferably curved, as indicated at 72, so that when the blades are vertical their curved ends converge to facilitate placing of the bag body thereon. When the blades are horizontal, their curved ends extend downward so that the bag body may spread out flat upon the upper surface of the blades (Fig. 11).

The bag body is thrust inward on blades 22 until the forward edge of the extension 7 of the bag body engages a stop 73 (Figs. 5, 6 and 37), which is radially adjustable upon a fixed supporting bracket 74. This positions the bag body with its corner including the extension 7 at the proper radial distance from the axis of the carriage 19 for subsequent operations to be performed. The radius of the stop 73 may be adjusted so that the apparatus may properly operate upon bag bodies of different sizes.

The apparatus includes five individual cam-controlled linkages, generally designated 75, one for each of the five bag-spreading devices, for individually moving the blades 22 of each bag-spreading device between the aforesaid collapsed and expanded positions. Each linkage is identical, and a description of one will suffice. Each linkage includes a cam follower lever 77 pivoted at 79 to a bearing bracket 81 fixed upon the base casting 33 of the carriage 19. A pair of links 83 are pivoted at one end to the follower lever upon a common pivot 85. One of the links 83 is pivoted at its other end to one of cranks 63, the other link 83 being pivoted at its other end to the other crank 63, as indicated at 87. Mounted in the free end of follower lever 77 is a cam follower 89 which rides upon a fixed barrel cam 91.

Cam 91 is fixed on the base 35 concentric with the carriage 19. It has an elevated arcuate horizontal track 93 and a low arcuate horizontal track 95. The carriage 19 and all the followers 89 rotate clockwise with respect to the cam, as viewed from above the apparatus. As the followers rotate, they ride up a steep cam rise 97 from the low track to the high track and, in so doing, pivot their respective follower levers 77 upward to the position illustrated in Fig. 3 and thereby pivot the blades 22 to the horizontal position. The followers ride off the high track down a gradually sloping cam fall 99, and the follower levers are gravity-biased to the position illustrated in Fig. 4 wherein they pivot blades 22 to their vertical position. Thus, when any follower is riding on the high track 93 the associated blades are horizontal and when it is riding on the low track 95 the associated blades are vertical.

Associated with each one of the spreading blades 22 of bag-spreading devices 21 are clamping devices 101 and 103 for clamping a spread bag body upon the blades when they are in horizontal position. Since five bag-spreading devices are illustrated, there are ten clamps 101 and ten clamps 103. The clamps 101, all identical as to construction, are adapted to clamp down upon the blades outside of the carriage 19 and are therefore hereinafter referred to as the "outside clamps." The clamps 103, all identical as to construction, are adapted to clamp down upon the blades inside the carriage, and are therefore hereinafter referred to as the "inside" clamps. The clamps 101 and 103 for one blade of any bag-spreading device 21 are inversely positioned with respect to the clamps 101 and 103 for the other blade of that device 21, as will be clear from Figs. 3, 4 and 7–10.

Each outside clamp 101 comprises a double-armed lever 104 pivoted for rocking movement on the outer end of shaft 59 extending from clevis 57. The lower end of the lower arm of the lever is formed as a clamping shoe 105. A tension spring 106 is connected between the upper arm of lever 104 and a stud 107 secured to the channel bar 53 in such manner as to bias the lever to move the clamp shoe 105 toward the related blade 22. Pivotal movement of the lever 104 in clamping direction is limited by a stop pin 108 extending outward from clevis 57 in position to be engaged by the upper arm of the lever.

The above arrangement is such that the clamp shoes 105 engage a spread bag body and clamp it upon the blades 22 as the latter approach a horizontal position (Figs. 3 and 8). As the blades turn to vertical position, the levers 104 pivot together therewith until their upper arms engage stops 108, whereupon further pivotal movement of levers 104 is arrested. Blades 22, however, continue to turn until they reach their vertical positions. The blades thus travel away from the clamp shoes 105 of the arrested levers 104 so as to become spaced therefrom, as illustrated particularly in Figs. 4 and 9.

Each one of inside clamps 103 includes a pair of bell crank levers 109 and 110 connected for conjoint rocking movement by a link 111. Lever 109 is pivoted for rocking movement inside the carriage coaxial with shaft 59 on clevis 57. Lever 110 is pivoted for rocking movement at 112 on the blade-carrying casting 61 on an axis parallel to that of lever 109. A clamp shoe 113 has legs 114 and 115 pivotally connected to the free ends of arms 116 and 117 of bell cranks 109 and 110, respectively. A tension spring 118 is connected between a pin 119 fixed in that end of the link 111 which is connected to bell crank 109 and a pin 120 fixed in blade-carrying casting 61. This spring biases the bell cranks to move the clamp shoe 113 toward the related blade 22.

Associated with each one of the five bag-spreading devices 21 is a bell crank lever 121 pivoted for rocking movement on a plate 123 fixed on channel 53. One arm of lever 121 is connected by a link 124 to an arm 125 of the left-hand bell crank 109 (as viewed in Figs. 8 and 9). The other arm of lever 121 is connected by a link 126 to the upper arm of a bell crank lever 127 pivoted at 128 on plate 123. The other arm of lever 127 is connected by a link 129 to the arm 125 of the right-hand bell crank 109. Clockwise rotation of lever 127 (as viewed in Figs. 8 and 9) is limited by an adjustable stop 130 carried by plate 123.

The above-described linkage connecting the inside clamping device 103 for one blade of a bag-spreading device to the inside clamping device 103 of the other blade is such that the clamp shoes 113 of the two paired clamps 103 are biased by their springs 118 into clamping engagement with the blades when the latter are horizontal, as illustrated in Fig. 8. As the blades turn to vertical position, the clamp shoes follow the blades, and bell cranks 109 and 110, links 111, 124, 126 and 129, bell crank 121 and lever 127 all move from their Fig. 8 positions toward their Fig. 9 positions under the bias of springs 118. Lever 127 rotates clockwise, as viewed in Figs. 8 and 9, until it engages stop 130. This arrests motion of the linkage and of clamp shoes 113, while blades 22 continue to turn to vertical position. The blades thus travel away from shoes 113 so as to become spaced therefrom, as illustrated in Fig. 9. At the same time, clamp shoes 105 of the outside clamps 101 are spaced from the blades. Thus, when the two blades 22 of a bag-spreading device 21 are in their vertical, collapsed position travelling through zone A, all clamps are disengaged from the blades so that a bag body may be placed thereon.

It is necessary, however, to raise the inside clamp shoes 113 for the two blades 22 of a bag-spreading device 21 as the latter travels through zone C to permit a valve sleeve 9 to be delivered into position for affixing to the bag body on the blades. For this purpose, the upper arm of the bell crank lever 127 is utilized as a cam follower lever in conjunction with a fixed arcuate cam 133.

Each of the five levers 127 is provided at its upper end with a cam follower roller 135. As the levers are carried around in a circular path by the carriage 19, their follower rollers 135 successively engage the cam 133. Cam 133 is positioned to depress each lever 127 from its Fig. 8 position, to rock each lever counterclockwise as viewed in this figure. It comprises a plate bent into an arc having the same radius relative to carriage 19 as the follower rollers 135. Cam 133 is mounted upon posts 137 and 139 in elevated position above the carriage. These posts extend upward from a horizontal mechanism plate 151 which is fixed upon the top of the central post 39 of the base structure.

Counterclockwise locking of levers 127 from their Fig. 8 position lifts link 129 and causes clockwise rocking of crank 121 to lift link 124, thereby rocking both bell cranks 109 and both bell cranks 110 to lift both clamp shoes 113 out of clamping engagement with the two blades 22. Thus, the two inside clamp shoes 113 for the two blades of a bag-spreading device 21 are raised as long as lever 127 for that device 21 is depressed by cam 133. This cam is of such arcuate length and so phased with respect to carriage 19 as to maintain the shoes 113 raised throughout the interval during which a valve sleeve 9 is delivered to a bag body as it travels through zone C.

From the above description, it will be clear that as any bag-spreading device 21 (including a related pair of blades 22) rotates through operating zone A, its blades 22 will be in the vertical, closely spaced relation illustrated in Figs. 4-6 and 9. The inside and the outside clamping devices 101 and 103 associated with the bag-spreading device will be released. Thus, an operator may readily place a bag body upon the pair of blades of the bag-spreading device, and thrust it inward thereon until its forward edge engages the stop 73. This positions the bag body in proper longitudinal registration for subsequent operations. To insure proper transverse registration of the bag body, i. e., accurate centering of the gusset side 3 between the pair of blades 22, vertical guide plates 153 (there being one such plate for each pair of blades) are adjustably fixed upon the carriage in such position as to extend within the central fold of the gusset as a bag body is moved inward on the blades (Figs. 4-6).

As any bag-spreading device rotates out of operating zone A, the related cam follower 89 rides up the cam rise 97 to the elevated track 93 of cam 91 and thereby causes the blades 22 of said device to swing to the horizontal position of Figs. 3 and 8 and spread the bag body thereon flat. At the same time, both the inside and outside clamp shoes 105 and 113 come into gripping relation with respect to the blades and firmly clamp the spread bag body upon the blades.

The blades 22 of the bag-spreading device remain in horizontal position until the related cam follower 89 rides down the cam fall 99, and then return to vertical position. The blades remain horizontal throughout their arc of travel from the trailing end of cam rise 97 to the leading end of cam fall 99. Throughout a portion of this arc (corresponding to the arc in which a valve sleeve is delivered upon the bag body), cam follower lever 127 is depressed by cam 133 to raise the inside clamp shoes 113 away from the blades to permit delivery of the sleeve. After the blades have returned to vertical position, the clamping devices are released and the valve bag body may be readily stripped from the blades as they move through operating zone F.

The oscillating turret

Figure 14:
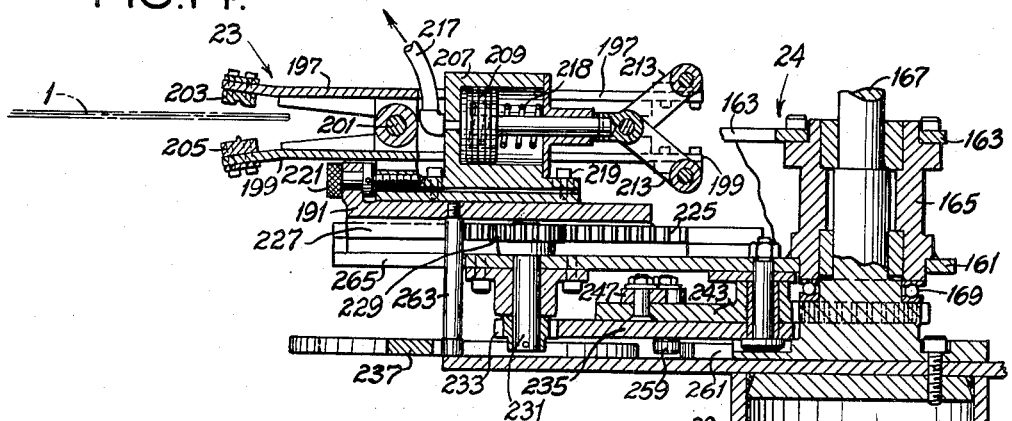
Fig. 14 is a vertical longitudinal section of the creasing device, taken substantially on line 14—14 of Fig. 12.
Figure 15:
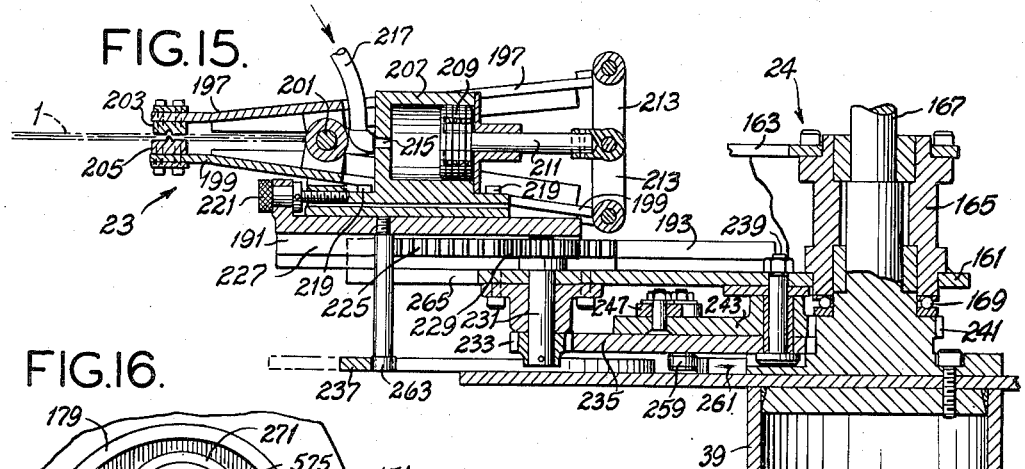
Fig. 15 is a section similar to Fig. 14, illustrating parts in a different position.

The turret 24 carries both the aforesaid creasing device 23 and valve sleeve delivery means 27. It comprises a pair of supporting plates 161 and 163 for supporting the creasing device and valve sleeve delivery means, respectively. Plate 161 is fixed upon the lower end and plate 163 is fixed upon the upper end of a sleeve 165 journalled for oscillation concentric with the carriage 19 upon a fixed post 167 extending upward from the central post 39 of the base structure. The weight of the turret is borne by a horizontal thrust bearing 169 upon which sleeve 165 rests (Figs. 14 and 15).

An annular gear 171 is fixed to and above the casting 33 of the carriage 19 upon posts 173 (Fig. 11). This gear surrounds center post 39 and is concentric with the carriage. A vertical shaft 175 journalled for rotation in the mechanism plate 151 carries a pinion 177 at its lower end in mesh with gear 171. Above the mechanism plate, shaft 175 carries a positive motion cam 179. Gear 171 rotates with the carriage 19 to drive pinion 177, shaft 175 and cam 179 with a speed ratio of one to five, so that cam 179 makes five revolutions for every revolution of the carriage. This ratio is required because there are five bag-spreading devices 21.

A sector gear 181 (Figs. 19-21) is pivoted for oscillation about a vertical axis upon a stud 183 extending upward from the mechanism plate 151. This sector gear carries a cam follower 185 riding in the endless cam groove 187 of cam 179. It meshes with a gear segment 189 fixed upon the turret-carrying sleeve 165. The arrangement is such that as the carriage 19 rotates, cam 179 rotates five times as fast as the carriage and acts upon follower 185 to oscillate sector gear 181 and thereby to oscillate gear segment 189, sleeve 165 and the plates 161 and 163 carried thereby. The cam 179 is so phased and its groove 187 is of such development that the turret 24 rotates in unison clockwise with carriage 19 from an initial position through an arc of approximately 43°, then returns to said initial position at much higher speed. Since cam 179 is driven five times as fast as the carriage, the turret will oscillate five times for every revolution of the carriage, so that it may carry out its functions with respect to bag bodies on every one of the five bag-spreading devices 21.

The radial center lines of plates 161 and 163 are angularly spaced approximately 72°. The purpose for this is to allow for delivery of a sleeve to a previously creased bag body upon one bag-spreading device 21 while the creasing device 23 is creasing the bag body upon the bag-spreading device which will next move into sleeve-receiving position with respect to the delivery means 27. This will be made clear subsequently.

The creasing device

The creasing device is carried by the supporting plate 161 of the turret 24. As illustrated more particularly in Figs. 12-15, it comprises a creaser carriage 191 adapted to slide radially inward and outward with respect to the axis of the turret and carriage 19 on guideways 193 fixed on plate 161. A block 195 is fixed on creaser carriage 191, but is capable of being longitudinally adjusted thereon as will be made clear. This block has pivotally mounted thereon upper and lower creaser levers 197 and 199, respectively, having a common transverse pivot 201. A female creasing die 203 and a cooperating male creasing die 205 are fixed upon the radially outer ends of the upper and lower levers, respectively, the dies extending transversely.

An air cylinder 207 having a piston 209 therein is bolted on block 195. The piston rod 211 of the piston is linked by means of toggle links 213 to the inner ends of the creaser levers 197 and 199. Cylinder 207 has an inlet 215 for compressed air, supplied through a flexible air line 217, behind the piston. When compressed air is admitted to the cylinder, the piston and its rod move radially inward to expand the toggle, and move the outer ends of levers 197 and 199 toward each other with resultant mating engagement of creasing dies 203 and 205. The piston and associated parts are return-biased by a spring 218.

The block 195 is adjustably secured on the creaser carriage 191 by means of screws 219 extending through longitudinal slots in the block and threaded into the carriage. An adjusting screw 221 rotatable, but fixed against axial movement, in an upstanding lug at the outer end of creaser carriage 191 is threaded into the forward end of the block. The arrangement is such that block 195 may be adjusted to various longitudinal positions with respect to the creaser carriage by loosening screws 219 and turning the adjusting screw. This permits variation of the position of the creasing dies 203 and 205 longitudinally with respect to the carriage for a purpose to be described.

The creaser carriage 191 is controlled to slide radially of the turret 24 on guideways 193 between an inner retracted position and an outer operative position, illustrated in Figs. 14 and 15, respectively. Being carried by the turret, it also oscillates about the axis of the carriage 19 with the turret within the aforesaid approximately 43° of arc. The initial angular position of the creaser carriage 191 is illustrated in Figs. 19 and 47 by line R connoting the radially extending center line thereof. It rotates clockwise in unison with carriage 19 through approximately 43° to the position illustrated in Figs. 19, 21 and 47 by the line S, then returns at higher speed to its initial position, and continuously repeats this cycle. The control for the creaser carriage 191 is such as to slide it radially outward to its outer operative position during the first approximately 20° of clockwise rotation, to cause it to dwell in that position for approximately the next 13°, and to return it to its inner retracted position during the final 10° of clockwise rotation. During counterclockwise return movement of the turret 24 and of the creaser carriage to the initial angular position, the creaser carriage remains in retracted position. The means for so controlling the radial movement of the creaser carriage is as follows:

The creaser carriage 191 is provided with a longitudinally extending rack gear 225 in a bottom recess 227 thereof. A pinion 229 fixed on the upper end of a vertical shaft 231 journalled in the supporting plate 161 is in mesh with the rack. A gear 233 is fixed on the lower end of shaft 231 beneath plate 161. This gear 233 is adapted intermittently to be driven by a sector gear 235 for driving pinion 229 to drive the rack 225 and move the creaser carriage 191 radially outward from the inner retracted position to the outer position thereof. Return of the creaser carriage inward to its retracted position is effected by a cam 237, as will be made clear.

The sector gear 235 is pivoted for oscillation on a vertical stud 239 depending from plate 161 adjacent sleeve 165. Just below thrust bearing 169 the post 167 is formed to provide a fixed gear 241. A lever 243, pivoted on stud 239 intermediate sector gear 235 and plate 161, is formed at its radially inner end as a gear 245 meshing with the fixed gear 241. A latch 247, pivoted on lever 243 at 249, is formed at one end as a hook 251 cooperable with a latch pin 253 extending upward from sector gear 235. This latch is biased toward latching engagement with pin 253 by a tension spring 255 connected between the other end of the latch and a stud 257 fixed on the turret 24. The latch 247 is provided on its end opposite the hook 251 with a cam follower 259 adapted to engage a cam 261 fixed on the mechanism plate 151. This cam is so developed and phased as to swing the latch 247 out of latching relation to the latch pin 253 when the creaser carriage has rotated clockwise the aforesaid 20° from its initial angular position and to maintain it unlatched throughout the 13° dwell and the 10° return, as will be made clear.

A stud 263 projects downward from the creaser carriage 191 through a slot 265 extending inward from the radially outer end of the plate 161. This stud forms a cam follower adapted to engage cam 237 when the creaser carriage has swung clockwise through 33° from its initial position. Cam 237 is fixed to the mechanism plate 151 and is shaped and located to be engaged by the follower 263 to move the creaser carriage radially inward from its outer operative position to its inner retracted position during the final 10° of its clockwise swing.

The above-described means for controlling the movement of the creaser carriage operates as follows:

Turret 24 is oscillated in an arc of approximately 43° as previously described to oscillate the supporting plate 161 and the creaser carriage 191 thereon through the same arc between initial and final positions R and S. In the initial position (Fig. 19), the latch hook 251 is engaged with latch pin 253. As the turret and the plate 161 rotate clockwise in unison with carriage 19 from this initial position, stud 239 is swung in an arc around the axis of fixed gear 241, whereupon gear 245 is rotated clockwise upon stud 239 to swing lever 243 clockwise. Since the hook 251 of latch 247 is engaged behind the latch pin 253 on the sector gear 235, sector gear 235 is also driven clockwise to rotate gear 233 counterclockwise, thereby to drive shaft 231 and pinion 229 counterclockwise (Fig. 12) and to drive the rack 225 and the creaser carriage 191 radially outward.

Figure 21:
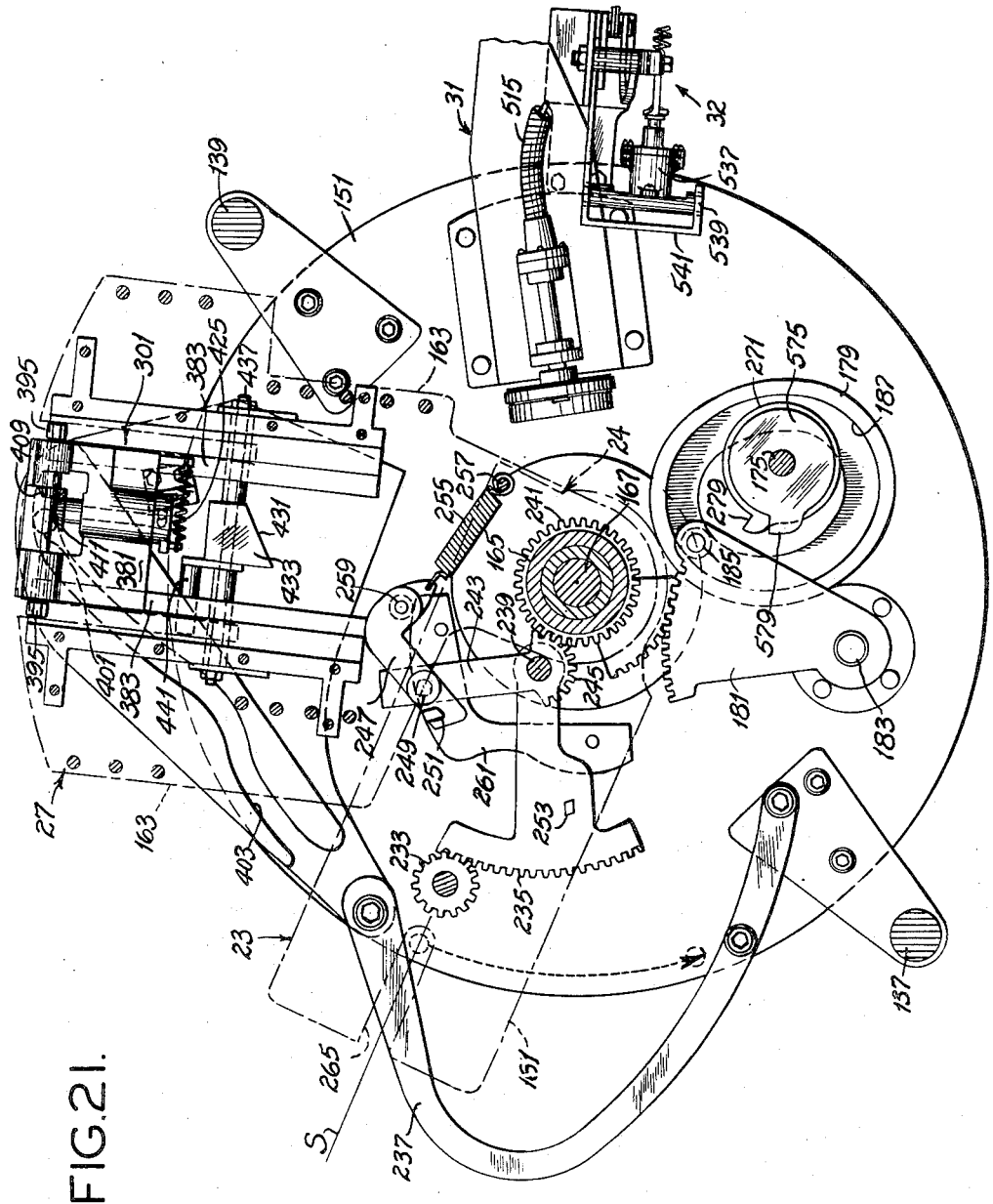
Fig. 21 is a section similar to Figs. 19 and 20, showing parts in a final position.

The creaser carriage continues to move outward until the turret 24 and the carriage have rotated through approximately 20°, whereupon the follower 259 on the latch 247 strikes cam 261 and the latch hook 251 is disengaged from latch pin 253 (Fig. 20). This disengages sector gear 235 from the drive therefor, and hence stops the creaser carriage 191 in a radially outermost position, which is its operative position for forming a crease in a bag body. Subsequently, gear 245 continues to rotate clockwise, but since it is disconnected from sector gear 235, it pivots on stud 239 relative to the sector gear to swing lever 243 out of alignment with gear 235 (Fig. 21).

Upon disconnection as above described of the drive for sector gear 235 after 20° of rotation, the sector gear 235, gear 233, pinion 229, rack 225 and the creaser carriage 191 remain relatively fixed with the creaser carriage in its outer operative position for the next 13° of rotation. Thereupon, the cam follower 263 engages the operative face of cam 237 to move the creaser carriage radially inward to its inner retracted position within the final 10° of rotation. As the creaser carriage moves inward, rack 225 drives pinion 229, shaft 231 and gear 233 clockwise. Gear 233 thus pivots sector gear 235 counterclockwise on its pivot 239 to the position relative to gear 233 illustrated in Fig. 19, which is the same as the relative positions of these parts at the start of a cycle of oscillation. Compare Figs. 19 and 21. Return of the carriage to retracted position is completed when it reaches ultimate angular position S (Fig. 21).

The turret 24 then reverses, and the creaser carriage 191, now in its inner retracted position, is pivoted counterclockwise back to its initial angular position R (Fig. 19). Gear 245 is thereby rotated counterclockwise on its pivot 239 and swings lever 243 counterclockwise. This returns the latch 247 into position wherein its hook 251 engages behind latch pin 253, the latch being snapped into such position by spring 255, so that the parts are in proper position for repetition of the cycle.

Thus, as any one of bag-spreading devices 21 rotates into radial alignment with the creasing device 23 in its initial angular position, the creasing device 23 starts to rotate in unison therewith. The radial center line of the creaser carriage 191 (and of the creasing dies 203 and 205) thus remains coincident with the radial center line between the horizontal blades 22 of the said bag-spreading device throughout the 43° of forward rotation of the creaser carriage. In the course of this forward rotation, the creaser carriage is moved radially outward from its inner retracted position (Fig. 14) to its radially outer operative position (Fig. 15) in 20°, and dwells in the outer position for the next 13°.

Figure 17:
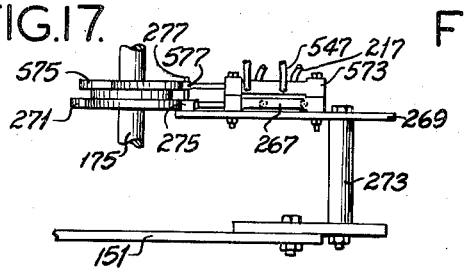
Fig. 17 is a side elevation of the valve-operating mechanisms of Fig. 16.
Figure 18:
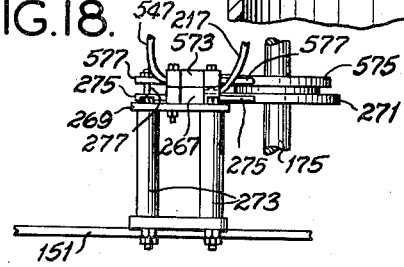
Fig. 18 is an end elevation of the valve-operating mechanisms of Fig. 16 as viewed from the right thereof.
Figure 16:
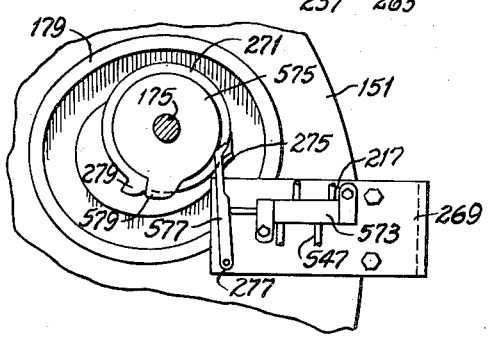
Fig. 16 is a fragmentary detail plan of certain cam-operated valve mechanisms.

When the creaser carriage is in its outer position, the creasing dies 203 and 205 are in proper position to form the crease X. That is, they are at such radial distance from the axis of carriage 19 as to form the crease at the required distance from the mouth edge of the bag body. The dies are operated during the aforesaid 13° dwell of the creaser carriage. This is accomplished as follows:

The flexible air line 217 connects to the outlet port of a conventional two-way reciprocating valve 267 (Figs. 16–18). Details of this valve are not shown since such valves are well-known. The inlet port of the valve is connected to a suitable source of compressed air (not shown). Valve 267 is mounted on a platform 269 at the level of a cam 271 fixed on shaft 175. The platform is supported above the mechanism plate 151 by posts 273. A cam follower lever 275 is pivoted at 277 on the platform for operating the valve upon engagement of the lever by the lobe 279 of the cam.

Valve 267 is normally set to vent the line 217 and creaser cylinder 207 to atmosphere so that the creaser levers 197 and 199 and creaser dies 203 and 205 are in their Fig. 14 position. When the cam lobe 279 engages the follower lever 275, the valve is operated to admit compressed air to the creaser piston 209 through line 217 to actuate the creaser dies. The cam is so developed and phased that the valve 267 is actuated to operate the creaser dies during the 13° dwell of the creaser carriage, i. e., while the creaser carriage is in its radially outermost position. Since shaft 175 and cam 267 thereon make five revolutions for each revolution of the carriage 19, the creaser dies are operated five times during each revolution of the carriage. Thus, bag bodies on all the bag-spreading devices 21 are creased as they travel one by one through operating zone B.

*Valve sleeve delivery*

The delivery means 27 for delivering a valve sleeve 9 upon the spread bag body carried by each set of bag-spreading blades in proper position for affixing of the sleeve to the bag body is particularly illustrated in Figs. 2, 3, 11 and 19–25. This delivery is effected after the bag body has been creased and while it is being conveyed through the aforesaid operating zone C. Delivery is ultimately effected by a reciprocating sleeve feeding device 301 carried by the turret 24 for oscillation therewith upon the aforesaid plate 163. This sleeve feeding device is adapted to push sleeves radially outward off the lower horizontal delivery end 303 of a chute 305 carried by the turret 24 on to the upper surface of the bag body and to a position wherein a long side of the sleeve is coincident with the outer edge of the bag body extension 7 (note Fig. 41). This action occurs during the forward rotation of the turret in unison with the carriage 19 and while the longitudinal center line of the sleeve feeding device is aligned with the center line between a pair of blades 22.

As illustrated more particularly in Figs. 3 and 11, the plate 163 of turret 24 carries a pair of transversely spaced side frames 307. The central vertical plane between these frames is coincident with the center line of plate 163 and hence extends radially from the vertical axis of the turret and carriage 19. These side frames carry the delivery chute 305, which comprises a metal plate bent to form the lower horizontal delivery end portion 303, an inclined intermediate chute portion 309, and an upper horizontal receiving end portion 311. This upper horizontal receiving end 311 of chute 305 is adapted to have valve sleeves intermittently delivered thereto by conveyor means 313 to be described.

Any sleeve received upon the upper receiving end 311 of the chute 305 is adapted to be fed forward and down the inclined portion 309 of the chute by feeding means including a pair of endless chains 315 which are driven in counterclockwise direction as viewed in Fig. 11. These chains are trained around sprockets 317, 319, 321 carried by shafts journalled in the side frames 307, with their upper flights just beneath the chute 305. The chains carry sleeve feeding fingers 329 which, in the course of their travel with the upper flights of the chains, extend through transversely spaced slots 330 (Fig. 2) in chute 305 for feeding the valve sleeve forward and down the chute.

The chains 315 are driven as follows: Shaft 175 has a sprocket 331 fixed adjacent its upper end (Fig. 11). A sleeve 333 journalled for rotation on the upper end of post 167 has its lower end formed as a sprocket 335. Sprockets 331 and 335 are connected by a chain 337, whereby shaft 175 drives sleeve 333. The sleeve 333 is formed at its upper end as a bevel gear 341 meshed with a bevel gear 343 fixed on a transverse horizontal shaft journalled at its ends in side frames 307. This shaft is connected by a chain and sprocket drive 345 (Figs. 1, 3 and 11) to drive sprocket 319 and consequently the chains 315 in counterclockwise direction.

A valve sleeve 9 fed down the inclined portion of the chute is adapted to be fed forward on to the lower horizontal delivery end 303 of the chute by feeding means including a pair of endless chains 349, driven in clockwise direction as viewed in Fig. 11. These chains are trained around sprockets carried by shafts journalled in extensions 367 of the side frames 307, with their lower flights just above the chute 305. Chains 349 carry sleeve feeding fingers 369 which, in the course of their travel with the lower flights of the chains, engage the rearward edge of a valve sleeve and feed it onto the lower horizontal delivery end of the chute. The chains 349 are driven at somewhat higher speed than chains 315 by a chain and sprocket drive 371 and a set of gears 320 and 322 (Figs. 3 and 11).

As illustrated more particularly in Figs. 19–25, the reciprocating sheet feeding device 301 includes a delivery carriage 381 carried for oscillation with the turret 24 and for radial reciprocation beneath the plate 163. The delivery carriage 381 slides upon upwardly facing bearing surfaces 383 of a pair of transversely spaced bearing members 385 secured to the bottom of plate 163. The delivery carriage 381 is constrained against transverse movement relative to the bearing members by means of tapered gibs 387 fixed to the carriage and engaging beveled edges of the bearing members.

The delivery carriage 381 carries a transverse shaft 389 journalled in transversely spaced bearings 391 and 393 extending upward from the carriage. This shaft carries sleeve feeding fingers 395 on its ends outward of said bearings. Shaft 395 is adapted to be oscillated to pivot fingers 395 between an operative sleeve feeding position wherein they extend vertically upward through slots 397 in plate 163 and slots 330 in the delivery end 303 of chute 305 for pushing a valve sleeve 9 radially outward off the delivery end 303 upon radially outward movement of delivery carriage 381 (Figs. 24 and 25), and a retracted position wherein fingers 395 are below 303 (Figs. 22 and 23). Means for oscillating the shaft 389 in such manner will be described.

The delivery carriage 381 is moved radially outward from an initial inner retracted position (Figs. 19 and 23) during the forward rotation of turret 24 in unison with carriage 19 for valve sleeve delivery and returned inward to retracted position during the return movement of the turret by a positive motion cam means. This means comprises a cam follower stud 401 riding in a cam groove 403 in a cam plate 405 fixed on the mechanism plate 151. The cam follower 401 is fixed to an adjustment plate 407 which is longitudinally adjustably connected to the delivery carriage 381 so that the locus of reciprocation of the delivery carriage may be varied. The cam groove 403 is so developed and phased that as the follower 401 rotates forward upon forward rotation of turret 24, the follower is cammed radially outward to slide delivery carriage 381 radially outward. As the follower 401 rotates back to initial position upon reverse rotation of the turret 24, it is cammed radially inward to slide carriage 381 radially inward to its inner retracted position of Figs. 19 and 23.

This action occurs as the delivery carriage 381 oscillates with turret 24 within the aforesaid operating zone C. The initial angular position of the radial center line of the carriage 381 is connoted by the line T (Figs. 19 and 47). It rotates forward in unison with the carriage 19 through about 43° to the limit of oscillation connoted by line U, then returns at higher speed to the initial position, and continuously repeats this cycle, since it oscillates with turret 24. The phasing is also such that as the delivery carriage 381 rotates forward in unison with carriage 19, its radial center line is aligned with the center line between a pair of blades 22, for proper delivery of valve sleeves.

The stated means for oscillating the finger-carrying shaft 389 is as follows:

Shaft 389 has a bevel gear 409 fixed thereon intermediate its bearings 391 and 393. This gear meshes with a bevel gear 411 fixed on the forward end of a longitudinal shaft 413 journalled in bearings 415 on the delivery carriage 381. At its rearward or radially inner end, shaft 413 carries a collar 417 from which extends a trip lever 419, adapted to swing between positions determined by stops 421 and 423 fixed to the delivery carriage. The arrangement is such that when lever 419 engages stop 421, shaft 413 has turned shaft 389 (through gears 411 and 409) to the position wherein sleeve feeding fingers 395 extend vertically upward in feeding position (Figs. 24 and 25). When lever 419 engages stop 423, feeding fingers 395 extend more or less horizontally in retracted position (Figs. 22 and 23). The trip lever is adapted to be snapped from one of its limiting positions to the other and to remain biased in position against one or the other of stops 421 and 423 by means of an overcentering spring mechanism including a tension spring 425 connected between a pin 427 fixed on collar 417 and a stud 429 fixed on the delivery carriage.

When delivery carriage 381 is in its initial retracted position (Figs. 22 and 23), trip lever 419 is in engagement with stop 423 and sleeve feeding fingers 395 are retracted. As turret 24 rotates forward from its initial position, thereby causing the delivery carriage to slide radially outward, trip lever 419 comes into engagement with the angled camming edge 431 of a tripper 433, and is thereby pivoted counterclockwise as viewed in Fig. 22 until spring 425 overcenters and snaps lever 419 against stop 421, thus raising the fingers 395 to feeding position. When lever 419 engages stop 421 it is clear of the tripper 433 so that the delivery carriage may continue its outward movement. Thus, valve sleeve feeding fingers 395 are raised into position to push a valve sleeve off the delivery end 303 of chute 305 on to a spread bag body. The delivery carriage 381 travels outward a distance, as determined by the cam groove 403, such that fingers 395 push a valve sleeve 9 into position wherein its rearward edge is aligned with the edge of bag body extension 7.

As the delivery carriage 381 approaches the forward limit of its 43° swing (line U, Fig. 47), trip arm 419 strikes a stop 435 fixed on cam plate 405 and is thereby snapped back against stop 423 to retract fingers 395. The purpose for this action is to clear the delivery end 303 of chute 305 to receive the next valve sleeve fed thereto by chains 349. Thus, the fingers 395 are in retracted position during the return inward movement of the delivery carriage 381 as it rotates back to its initial position connoted by line T.

In order to permit the trip lever 419 to return to the position of Figs. 22 and 23 behind the tripper 433, the latter is pivoted for rocking movement on a transverse shaft 437 carried by straps 439 fixed to and extending downward from bearing members 385. The tripper is biased to pivot counterclockwise on shaft 437, as viewed in Figs. 23 and 25, by weight 441 carried on an arm 443 extending forward from the tripper. Such pivotal movement of the tripper is limited by the engagement of a shoulder 445 thereon with a stop 447 carried by the straps 439. With shoulder 445 in engagement with stop 447, the angled camming edge 431 of the tripper is in position to be engaged by trip lever 419 on its forward movement. Near the end of the inward return movement of the delivery carriage 381, however, the lower end of lever 419 strikes the shoulder 449 of the tripper and rocks it clockwise, as illustrated in dotted lines in Fig. 25, to permit lever 419 to return behind the tripper. When the lever 419 rides off the tripper, the latter is biased by weight 441 to its normal position with shoulder 445 engaging stop 447.

Sleeves are delivered to the upper horizontal receiving end 311 of chute 305 by conveyor means 313. This means includes a table 461 (Figs. 1, 2 and 11) cantilevered outward from a supporting frame 463 with its free end overhanging the carriage 19. Table 461 has a pair of transversely spaced longitudinal slots 465 therein. A pair of endless conveyor chains 467 are trained around sprockets 469 and 471 carried by shafts 473 and 475 journalled beneath the ends of the table. The upper flights of these chains travel just below the table and are aligned with slots 465. The chains carry sleeve feeding fingers 477 which, in the course of their travel with the upper flights of the chains, extend upward through slots 465 for pushing valve sleeves forward along the table toward the turret.

Figure 26:
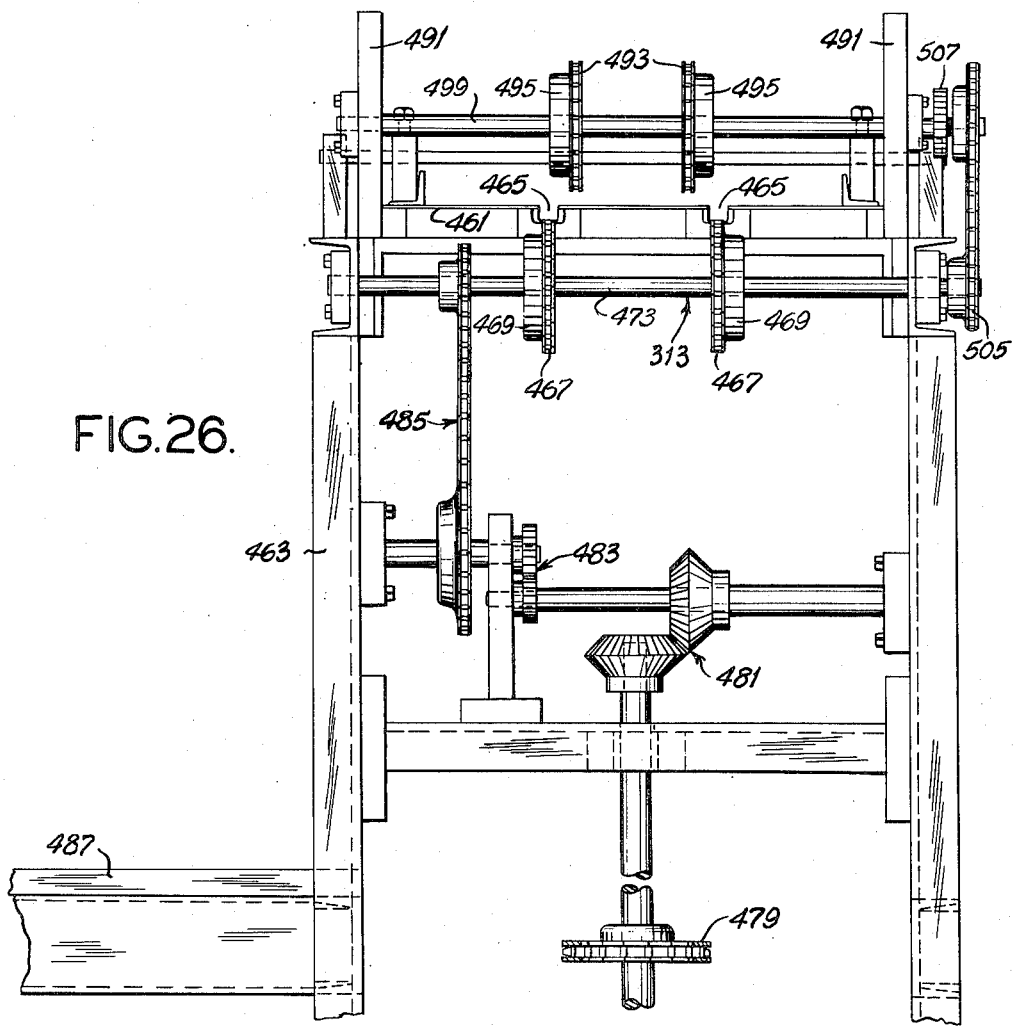
Fig. 26 is an enlarged vertical section taken substantially on line 26—26 of Fig. 1.

The chains 467 are driven by the motor 49 through a chain and sprocket drive 479 taken off the vertical output shaft of speed reducer 47. This drive is coupled to the shaft 473 by a bevel gear drive 481, a spur gear drive 483 and another chain and sprocket drive 485, all supported in frame 463 (Fig. 26). The chains 467 are driven counterclockwise as viewed in Figs. 1 and 11. The frame 463 includes a platform 487 for a seat 489 for an operator who places valve sleeves 9 one by one on the table 461 in position to be advanced by fingers 477. The sleeves are deposited on the table with their long dimensions transverse to the direction of advance.

Table 461 carries a frame 491 at and above its forward end overhanging carriage 19. This frame supports a sleeve feeding means comprising a pair of endless chains 493 trained around sprockets 495 and 497 carried by shafts 499 and 501 journalled in the frame. The lower flights of these chains travel just above the table. Each chain carries a sleeve feeding finger 503. These fingers, in the course of their travel with the lower flights of the chains, feed a sleeve from the forward end of table 461 on to the receiving end 311 of chute 305. The chains 493 are driven in clockwise direction, as viewed in Figs. 1 and 11, at somewhat higher speed than chains 467 by a chain and sprocket drive 505 taken off shaft 473 and driving shaft 501 through reversing gearing 507.

It will be understood that the timing of all of said sleeve feeding chains and the relative positions of the sleeve feeding fingers thereon is such that a valve sleeve 9 is delivered to the lower horizontal delivery end 303 of chute 305 in timed relation to the operation of reciprocating sleeve feeding device 301. That is, a valve sleeve is delivered to 303 before the sleeve feeding fingers 395 have started to move radially outward from their radially innermost position so that a sleeve will be delivered upon each and every bag body as it travels through operating zone C.

*Valve sleeve stitching*

After any bag-spreading device 21 has completed its travel through operating zone C, the spread bag body thereon has a valve sleeve 9 assembled therewith in the manner illustrated in Fig. 41 as a result of the above-described valve sleeve delivery. The valve sleeve is clamped in assembled relation with the bag body by both the outside and inside clamps 101 and 103. The inside clamps are in clamping position since the follower lever 127 for the particular bag spreader 21 has travelled out from under cam 133. To affix the valve sleeve 9 to the bag body 1, as illustrated herein, the sewing machine 31 is employed for stitching the sleeve to the bag body.

The sewing machine 31 may be any conventional stitcher suitable for this purpose. It is fixedly mounted on the mechanism plate 151 at such an elevation and with its needle 511 at such radial distance from the axis of the carriage 19 that it is adapted to form the arcuate stitched seam 11 securing a valve sleeve 9 to the extension 7 of a bag body 1 as they travel between the stitching plate and needle of the sewing machine. The arcuate character of seam 11 results from the arcuate path of travel of the extension 7 and sleeve 9 with respect to the needle 511. The radial distance of the needle 511 from the axis of carriage 19 is somewhat less than the radial distance of the radially inner edges of blades 22 from said axis. The stop 73 (Figs. 5 and 6) is adjusted so that when a bag body is placed on blades 22 the extension 7 of the bag body extends radially inward beyond the inner ends of the blades. Thus, the extension 7 and valve sleeve 9 travel over the platen 513 of the sewing machine 31 and intersect the path of reciprocation of needle 511 (Fig. 27). As illustrated herein, sewing machine 31 is continuously driven by a drive including a flexible shaft 515 taken off the vertical output shaft of speed reducer 47. It is contemplated, however, that the sewing machine may be driven in other suitable ways, as, for example, by an individual motor.

The stitching of the valve sleeve 9 to the extension 7 is completed when the sleeve and extension travel beyond the needle 511. The stitching mechanism of the sewing machine 31 continues to form a stitched strand 521 (Fig. 43), which extends from the stitching mechanism to the trailing end of seam 11. This strand lengthens as the sleeve and extension travel away from the needle. It is necessary to sever this strand and the cutter 32 is provided for this purpose.

As illustrated particularly in Figs. 28–30, cutter 32 comprises an upright supporting plate 523 mounted on a bracket 525 secured to the mechanism plate 151 adjacent and ahead of the sewing machine 31 with respect to the direction of travel of carriage 19. Pivoted at 527 on plate 523 is a rocking lever 529, the lower arm 531 of which is curved as illustrated. A tension spring 533 is connected between the upper end of the upper arm of lever 529 and the plate 523 to bias the lever to rock clockwise as viewed in Figs. 28 and 29. The lever 529 is adapted to be rocked counterclockwise by the piston rod 535 of a pneumatic cylinder and piston device 537. The cylinder of the latter is pivoted at 539 for rocking movement in a bracket 541 secured to plate 523. The end of piston rod 535 engages the lower end of an arm 543 which extends from the upper end of the lever 529. The cylinder has an air inlet 545 to which is connected a flexible air line 547.

A generally C-shaped plate 549 is secured to the supporting plate 523 with its upper and lower arms 551 and 553 offset therefrom. The upper and lower arms of plate 549 are provided with vertical slots 555 and 557 in their free ends. A pair of shear blades 559 and 561 and the free end of the curved lower arm 531 of lever 529 have a common pivot at 563. Blade 559 has an arm 565 loosely pinned at 567 in the upper slot 555. Blade 561 has an arm 569 loosely pinned at 571 in the lower slot 557 so that the pin may slide in the slot.

When pressure in the cylinder of device 537 is relieved, spring 533 rocks lever 529 clockwise and biases the parts to the Fig. 28 position wherein the shear blades 559 and 561 are open, pin 571 being at the lower end of lower slot 557. When compressed air is admitted to the cylinder, piston rod 535 rocks lever 529 counterclockwise toward the Fig. 29 position. This swings the pivot 563 counterclockwise, causing the blades 559 and 561 to rise and to pivot toward each other, pin 571 rising to the upper end of slot 557.

The cutter 32 is so located that the blades move into position to sever the strand 521.

Means is provided for operating the cutter 32 by supplying compressed air to the cylinder 537 just after the trailing end of a seam 11 has traveled beyond the cutter. This means includes a conventional two-way reciprocating valve 573 similar to and mounted on and above the two-way valve 267 (Figs. 16-18). The flexible air line 547 connects to the outlet of valve 573, which is positioned at the level of a cam 575 fixed on shaft 175 above cam 271. The inlet of the valve is connected to the aforesaid source of compressed air (not shown). A cam follower lever 577 is pivoted at 277 above lever 275 for operating valve 573 upon engagement of the lever by the lobe 579 of the cam.

Valve 573 is normally set to vent the line 547 and cylinder 537 to atmosphere so that the cutter parts are normally in the Fig. 28 position with the shear blades 559 and 561 retracted and open. When the cam lobe 579 engages the follower lever 577, the valve is operated to admit compressed air to the cylinder 537 through line 547 to actuate the shear blades. The cam is developed and phased to operate the shear blades just after the trailing end of a seam 11 has travelled beyond the blades. Since shaft 175 and cam 575 thereon make five revolutions for each revolution of the carriage 19, the cutter 32 is operated five times during each revolution of the carriage. Thus, strands 521 trailing from all the bag bodies are severed as the bag bodies travel one by one away from the sewing machine 31 in operating zone D.

*Valve sleeve folding*

After any bag-spreading device 21 carrying a bag body 1 to which has been stitched a valve sleeve 9 travels out of operating zone D and enters operating zone E, the blades 22 of the bag-spreading device start to swing to their vertical, collapsed position of Figs. 4 and 9. Swinging of the blades to their vertical position collapses the bag body from its previous spread condition and causes the gusset sides 3 and 5 of the bag body to fold in, due to the inherent tendency of the gusset sides to re-fold. The valve sleeve 9, not having previously been folded, does not have any inherent tendency to fold in with the gusset side 3. To insure that it does fold in, means is provided for delivering a blast of air from nozzle 34 against the sleeve as the blades 22 swing from horizontal to vertical position (Fig. 44).

Figure 31:
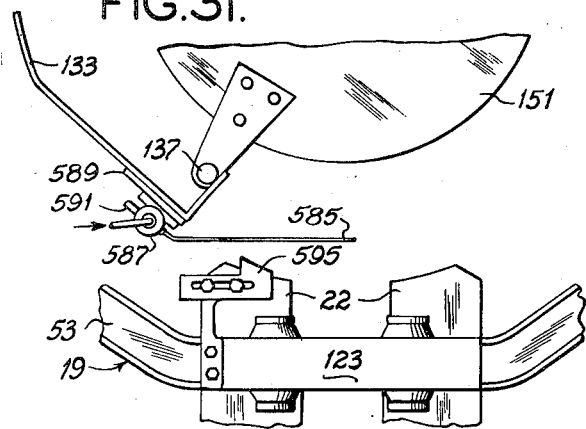
Fig. 31 is a fragmentary plan view detailing a valve-operating mechanism for a valve sleeve folder.

As illustrated particularly in Figs. 1, 3 and 31, the nozzle 34 is formed at one end of a pipe 585, the other end of the pipe being connected to the outlet of a conventional reciprocating valve 587. The latter is mounted upon a bracket 589 carried by cam plate 133 adjacent the upper end of post 137 (Figs. 3 and 31). The nozzle end of the pipe 585 is downwardly directed at a point ahead of the trailing end of cam fall 99 (in relation to the direction of rotation of carriage 19), and at a radial distance from the axis of carriage 19 such that the air blast will impinge upon a valve sleeve 9.

The inlet of the valve is connected to the aforesaid source of compressed air (not shown). A follower lever 591 is pivoted at 593 on the bracket 589 for operating the valve upon engagement of any one of five camming lugs 595 with the depending free end of the lever. The lever 591 is normally biased downward to close the valve, its movement in downward direction being limited by a stop pin 599 extending outward from bracket 589.

The five camming lugs 595 are carried upon carriage 19 at equally spaced intervals around its upper periphery in position to engage the depending free end of lever 591 in the course of their rotation with the carriage. These lugs are conveniently carried by the plates 123 fixed on channels 53. Each lug is adjustably mounted on a plate 123 adjacent the stop 130 thereon, as indicated in Figs. 8 and 9. Each lug extends radially inward from plate 123 far enough to engage lever 591 as it rotates past valve 587 and to lift the lever to open the valve for a short interval.

The camming lugs 595 are phased so as to open the valve each time a bag-spreading device 21 has entered operating zone E, i. e., as the blades 22 of said device swing from vertical to horizontal. The arrangement is such that as any bag-spreading device enters zone E, a camming lug 595 engages lever 591 to lift it and open the valve 587. This establishes communication from the source of compressed air through the valve and pipe 585 to the nozzle 34 to cause a blast of air to be delivered upon the valve sleeve 9 of the bag body carried by the blades of that particular bag-spreading device. Since these blades are turning to vertical position and gusset side 3 is re-folding, the air blast drives the valve sleeve 9 into the gusset fold. Thus, infolding of the valve sleeve with the gusset side 3 is assured. When the camming lug 595 rides out from under lever 591, the lever drops, and the valve 587 closes to cut off the air supply from the nozzle.

*Valve sleeve ejecting*

The apparatus of this invention is provided with means for automatically ejecting a valve sleeve 9 from a bag-spreading device 21 to which it has been delivered if there is no bag body 1 on that device. In operation, carriage 19 rotates continuously and the operator at zone A, in applying bag bodies to the bag spreaders, may skip one of the spreaders as it travels through this zone. Even though there is no bag body on the skipped bag-spreading device, a valve sleeve 9 will be delivered thereto as it travels through zone C. This sleeve will be fed on to the bare blades 22 of the bag spreader and clamped thereon by the inside clamps 103. If not immediately removed, such a valve sleeve will be carried through zone D, wherein sewing machine 31 will apply a line of stitching thereto. Subsequently, such sleeves may be displaced from the blades in zone E or zone F and clog parts of the apparatus. In any event, it is difficult manually to remove such a sleeve as the carriage is rotating continuously. It is therefore desirable automatically to eject a sleeve from a pair of blades 22 as soon as they travel out of zone C if there is no bag body on the blades.

As particularly illustrated in Figs. 32-36, the valve sleeve ejecting means of this invention includes a nozzle 601 adapted to direct an air blast upon a valve sleeve 9 if there is no bag body on the blades 22 to which the sleeve has been delivered. This nozzle is positioned to blow the sleeve downwardly away from the blades just after they have travelled out of operating zone C (the valve sleeve feeding zone). The nozzle is formed at the lower end of a pipe 603, the upper end of which connects to the outlet port of a conventional reciprocating valve 605. Details of such valves are well-known, hence not illustrated herein. The inlet of the valve is connected by a pipe 607 to the aforesaid source of compressed air (not shown). The valve is automatically opened to admit compressed air to pipe 603 in response to absence of a bag body on a pair of blades 22, remaining closed otherwise, by means to be described.

The ejector valve 605 is mounted above the carriage 19 upon a bracket 609 fixed on a beam 611. Beam 611 is supported at one end by a stud 613 which extends outward from table 461 adjacent its forward end, and intermediate its length upon the upper end of post 139. The other end of the beam is curved, as illustrated at 615 in Fig. 34, and to this curved end is secured the end of the arcuate cam plate 133. A shaft 617 is fixed in and extends outward from a lug 619 depending from beam 611 to the right of and below the valve 605 as viewed in Figs. 32, 33 and 35.

A sleeve 621 is rotatable on the shaft 617. The outer end of the sleeve is provided with a clamp 623 in which is clamped the upper end of an elongate rod 625 forming a bag detector. The rod extends downward and is bent out so that its lower end 627 is adapted to register with the space between a pair of blades 22 at a point radially outward from the valve sleeve 9 thereon. Fixed on the inner end of sleeve 621 is a control arm 629 which extends generally upward and to the left from shaft 617. This arm has lower and upper pins 631 and 633, respectively, extending inward (toward the center of carriage 19) from adjacent its upper end. The detector, sleeve and control arm assembly is gravity biased to rock counterclockwise, so that the lower end 627 of the detector 625 will drop into the space between blades 22 if there is no bag body 1 on the blades to hold it raised.

A valve-operating lever 635 for operating valve 605 is pivoted at 637 on the bracket 609. A bell crank comprising a generally horizontal arm 639 and a generally upwardly extending arm 641 is rotary on fixed shaft 617 intermediate the inner end of sleeve 621 and lug 619. The arm 639 of the bell crank carries a pin 643 adjacent its free end which extends inward therefrom over the valve-operating lever 635. The arrangement is such that when the bell crank rocks counterclockwise from its Fig. 32 position, the pin 643 engages lever 635 to rock it counterclockwise and open the valve. The bell crank normally is biased to rock clockwise by a tension spring 645 connected between a pin 647 on the upper end of arm 641 and a pin (not shown) fixed on the cam plate 133 at a point to the right of Figs. 32–34. It is adapted to be rocked counterclockwise against the bias of spring 645 by a reciprocating hook-ended link 649 in response to dropping of the lower end 627 of the detector into the space between blades 22 in the absence of a bag body, as will be made clear.

The link 649 is pivotally connected at its left end to the upper end of a cam follower lever 651. The latter is pivoted at its lower end on the stud 613. Link 649 extends from lever 651 between the pins 631 and 633 on the control arm 629, and between the pin 647 and a lower pin 653 on the arm 641. Pins 647 and 653 extend outward from arm 641 (Fig. 34). Link 649 is formed with an elongate notch 650 in its lower edge adjacent its right-hand end. The notch is shaped to provide a hooking shoulder 652 at its right end. This shoulder is adapted to engage pin 653 as link 649 moves to the left and thereby rock the bell crank arms 641 and 639 counterclockwise whenever detector 625 detects the absence of a bag body.

The cam follower lever 651 has a follower roller 655 thereon which is engaged by a cam 657 for oscillating the lever and reciprocating the link 649. Cam 657 is carried by a shaft 659 journalled in and extending outward from frame 491 adjacent its forward end. It is driven by a speed-reducing gear drive 661 taken off the sprocket shaft 473. The lever 651 is biased to maintain roller 655 in engagement with the cam by a tension spring 663 connected between a member 665 fastened to bracket 609 and the link 649.

Figure 33:
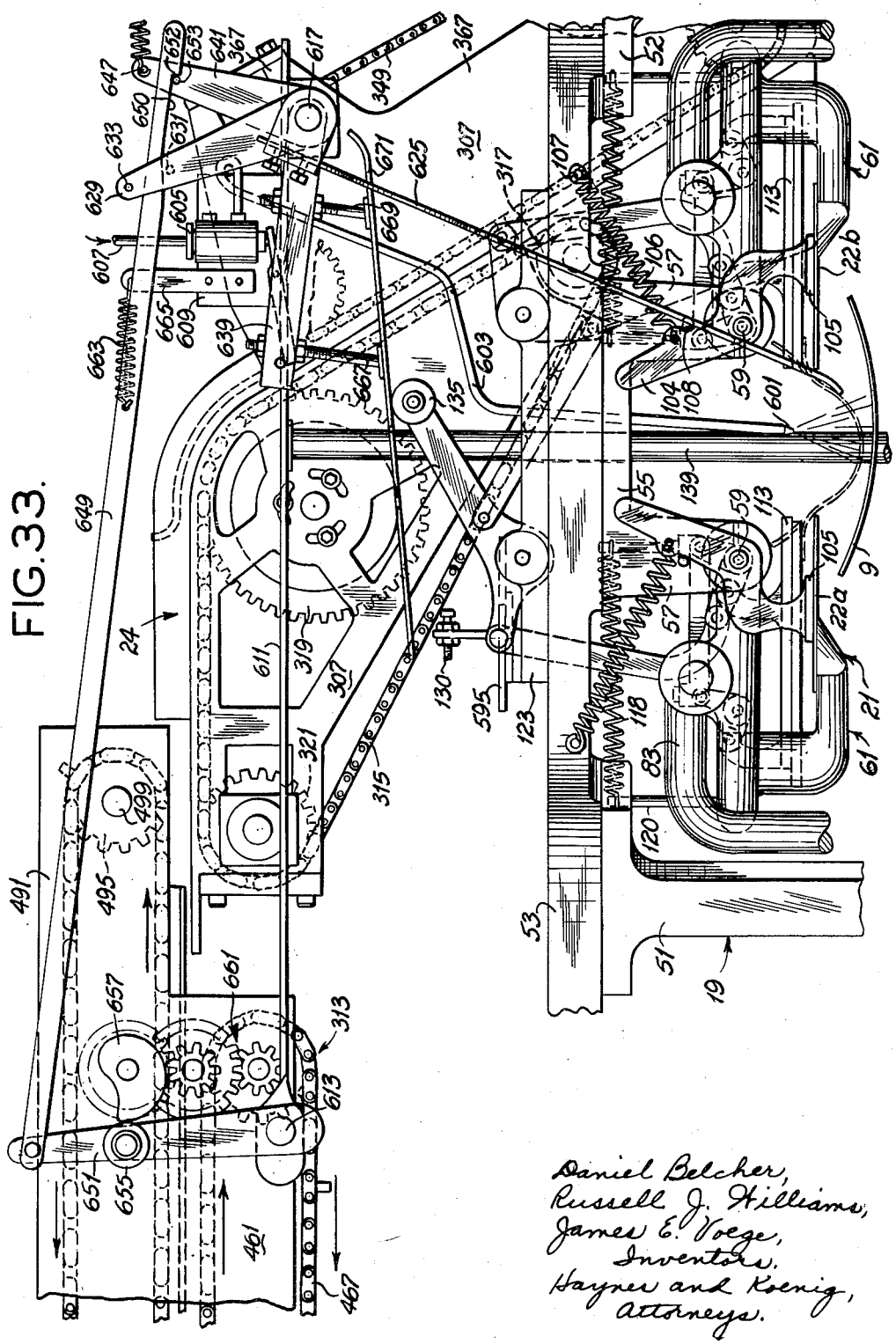
Fig. 33 is a view similar to Fig. 32, illustrating a valve sleeve being ejected.

Adjustably fixed in the arm 639 of the bell crank are bolts 667 and 669 which extend downward from the arm. These bolts carry a shoe plate 671 in position to engage the follower rollers 135 on levers 127 for operating the inside clamp devices 103. The shoe plate 671 is arcuate in plan (Fig. 34) corresponding to the arcuate path of travel of rollers 135. It is fastened to the lower ends of bolts 667 and 669 in any suitable way. The bolts are adjusted so that shoe plate 671 nominally is above the rollers 135, as illustrated in Fig. 32. When arm 639 rocks counterclockwise from its Fig. 32 position, the shoe plate engages the follower roller 135 of lever 127 travelling under the plate to rock the lever counterclockwise and lift the inside clamp shoes 113 away from blades 22, as illustrated in Fig. 33.

The cam 657 is so developed and phased with respect to the rotation of carriage 19 as to rock its follower lever 651 counterclockwise and drive link 649 to the left during that interval in which the lower end 627 of the detector 625 registers with the space between the blades 22 of any one of the five bag-spreading devices 21 as it travels under the lower end of the detector. The link 649 is quickly returned from its limit of movement to the left to its limit of movement to the right as the follower roller 655 on lever 651 rides down the steep fall 673 of the cam (Fig. 35). This return movement occurs substantially during the interval in which the trailing blade 22b of any bag-spreading device travels under the lower end 627 of detector 625. The cam 657 is so developed and phased that link 649 has very little movement to the left during that interval in which the lower end 627 of the detector registers with the space between adjacent bag-spreading devices 21 as they travel around with carriage 19.

The above-described arrangement is such that as any bag-spreading device 21 to which a valve sleeve 9 has been delivered travels out of the sleeve-feeding zone C it travels under the lower end 627 of the bag detector. As the lower end 627 of detector 625 registers with the space between the blades 22 of the bag-spreading device 21, link 649 is being moved to the left by cam 657 and follower lever 651. If there is a bag body 1 on the blades, as illustrated in Fig. 32, the lower end of the detector is maintained in raised position by the bag body. The detector 625, sleeve 621 and arm 629 remain in their Fig. 32 position. In this position, pin 631 on control arm 629 maintains link 649 raised so that the shoulder 652 of link 649 is raised above and cannot engage behind pin 653 as the link moves to the left. This is illustrated in Fig. 32, wherein the right-end portion of link 649 beyond the notch 650 is shown between pins 647 and 653. Thus, link 649 has no effect upon arm 641, and arm 639 remains in the Fig. 32 position.

Consequently, valve 605 is not operated, and shoe plate 671 remains raised above the roller 135 on lever 127.

Figure 46:
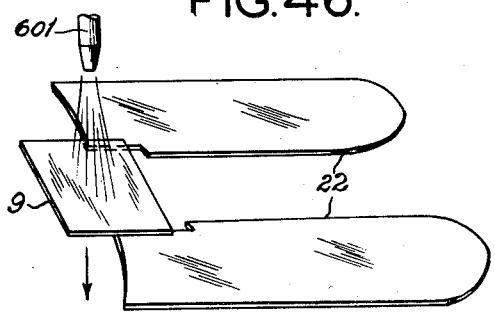

If there is no bag body 1 on the blades 22, however, the lower end 627 of the detector drops into the space between the blades. The detector 625, sleeve 621 and control arm 629 thereupon rock counterclockwise under their gravity bias to the Fig. 33 position. The pin 631 is thus lowered from the link 649 and the latter swings downward about its pivotal connection to lever 651 so that the shoulder 652 engages behind pin 653. Link 649, which is now moving to the left, pulls arm 641 to the left to rock arm 639 counterclockwise. The shoe plate 671 thereupon engages the roller 135 to depress lever 127 and release the inside clamp shoes 113 from the valve sleeve 9. Also, the pin 643 on arm 639 engages valve-operating lever 635 to open the valve and admit compressed air from line 607 to pipe 603. A blast of air is thus directed upon the valve sleeve, and it is blown downward away from the blades as illustrated in Figs. 33 and 46.

After the bag-spreading device 21 has travelled to the point where the lower end 627 of the detector is over the trailing blade 22b of the bag spreader, link 649 is quickly returned to the right by spring 663 as the follower roller 655 rides down the steep cam fall 673 (Fig. 35). When the trailing blade 22b travels out from under the lower end of the detector, said end drops into the space between adjacent bag-spreading devices 21 and thereby lowers link 649 from its Fig. 32 position to a position wherein shoulder 652 is behind, but not in engagement with, the pin 653. Link 649, however, has no substantial movement to the left during the interval in which the lower end of the detector registers with the space between adjacent bag spreaders 21, due to the particular development of cam 657. Consequently, it does not function to operate valve 605 and shoe plate 671 during this interval. When the leading blade 22a of the next bag spreader 21 travels into engagement with the lower end 627 of the detector, it raises 627 and moves the detector and control arm 629 back to their Fig. 32 position.

*Operation*

The carriage 19 is continuously driven throughout the operation of the apparatus. It rotates clockwise, as viewed from above, and carries the five bag spreaders 21 in an endless circular path. As the carriage rotates, turret 24, carrying the creasing device 23 and the valve sleeve delivery means 27, oscillates about the axis of the carriage in an arc of approximately 43°, as previously described. The turret makes five complete oscillations during each revolution of the carriage. The endless chains 467 and 493 of the sleeve feeding means 313 are continuously driven to advance sleeves 9 placed one by one on table 461 by an operator stationed on platform 487 to the feeder constituted by the turret 24. The endless chains 315 and 349 on the turret are continuously driven to advance sleeves from the upper receiving end 311 of chute 305 to the lower delivery end 303 of the chute.

As any one of the five bag spreaders 21 travels through zone A, the associated cam follower roller 89 is riding on the low track 95 of barrel cam 91. The blades 22 of the bag spreader are therefore in their vertical, collapsed, bag-receiving position of Figs. 4 and 9. Both the outside and inside clamping devices 101 and 103 are released to permit a bag body 1 to be placed on the blades. An operator stationed in zone A takes a flattened tubular bag body 1 from a supply, and opens it up sufficiently to permit entry of the blades into the bag body. He then places it on the blades with the gusset side 3 uppermost and the extension 7 forward, and thrusts it inward until its forward edge engages stop 73, as diagrammatically illustrated in Fig. 37. As the bag body is thrust inward, it is guided into proper position on the blades by the guide plate 153 on the carriage, this plate extending into the gusset fold. It will be understood that the carriage is rotating sufficiently slowly to give the operator time to carry out the above-described operation of placing a bag body on the blades.

As the bag spreader with a bag body thereon travels out of zone A, the associated cam follower roller 89 rides up the cam rise 97 to the elevated cam track 93 of the barrel cam 91. This actuates the cam-controlled linkage 75 for the bag spreader to swing its blades 22 downward and away from each other so that they move from their vertical position of Figs. 4 and 9 to their horizontal, spaced position of Figs. 3 and 8 to spread the bag body horizontally flat. The inside and outside clamping devices 101 and 103 come into clamping engagement with the uppermost surface of the spread bag body to clamp it firmly upon the blades. This action occurs prior to entry of the bag spreader into the creasing zone B.

Figure 2:
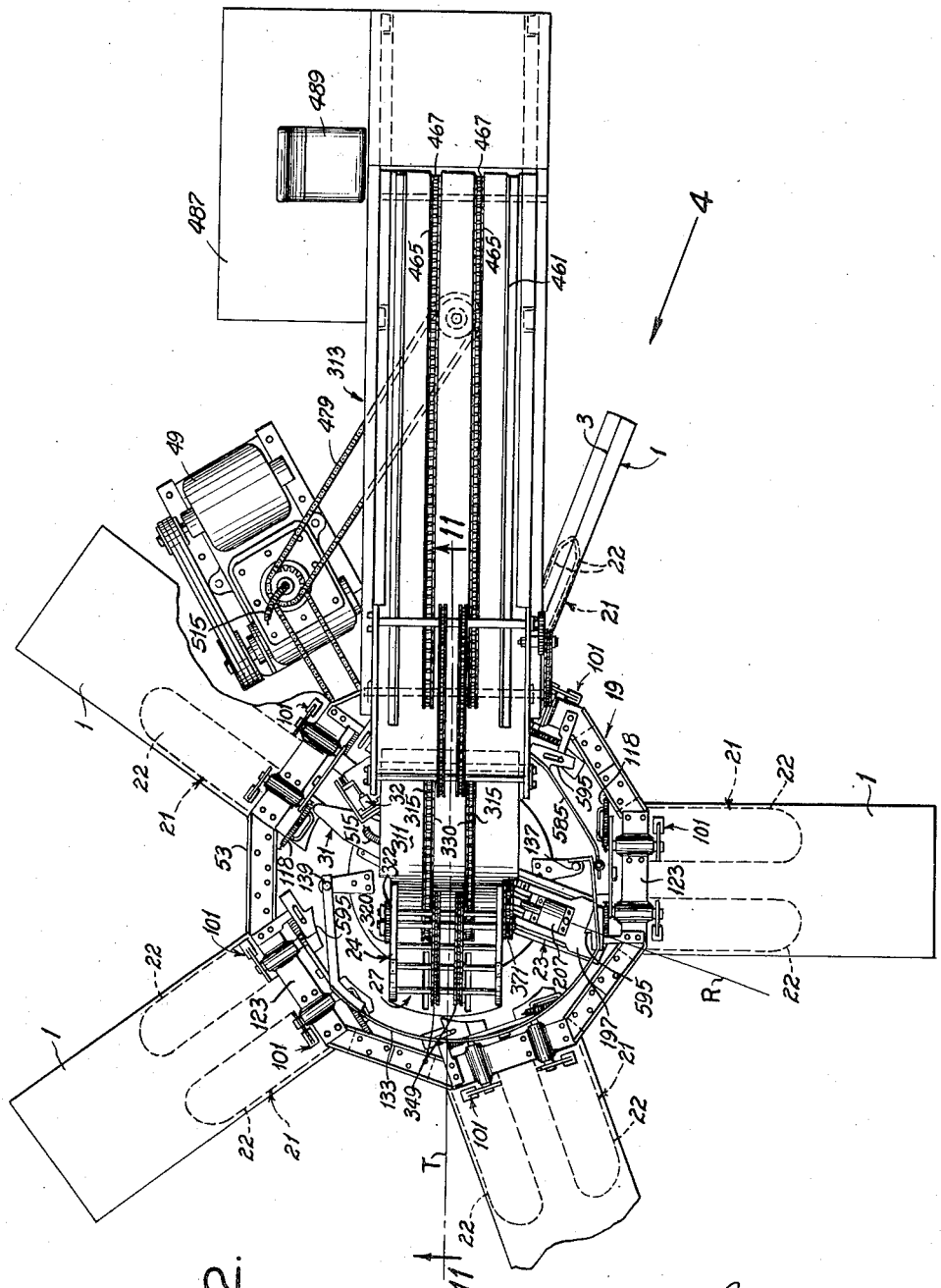
Fig. 2 is a plan view of the apparatus.

As the bag spreader 21 enters the creasing zone B, the turret 24 is in its initial angular position with the radial center line of the creaser carriage 191 in the angular position connoted by the line R in Figs. 2, 19 and 47. When the radially extending center line between the pair of blades 22 of the bag spreader comes into alignment with the radial center line of the creaser carriage, the turret 24 rotates forward (clockwise) in unison with the carriage 19, being driven by cam 179 and gears 181 and 189 as previously described.

During the first 20° of forward rotation of the turret in unison with the carriage 19, the creaser carriage 191 is moved radially outward as previously described from its inner retracted position of Fig. 14 to its outer operative position of Fig. 15. In the latter position, the inner end of the flattened gusset side 3 of the bag body is between the creaser dies 203 and 205, and the dies are in proper radial position for forming the crease X in this gusset side at the desired distance from the edge of bag body extension 7. It will be noted that the lower die 205 enters into the bag body 1. The mouth of the bag body is open sufficiently to permit this.

For the next 13° of forward rotation of the turret in unison with the carriage 19, the creaser carriage 191 and the dies 203 and 205 dwell in their outer operative position, as previously described. During this dwell, the lobe 279 of cam 271 engages the valve operating lever 275 to open valve 267. Compressed air is thus supplied through flexible air line 217 to cylinder 207 to actuate the creaser dies and form the crease X. When the lobe 279 rides off the lever 275, valve 267 vents cylinder 207 to atmosphere, and the creaser dies open. This occurs just before the conclusion of the dwell.

As the bag spreader 21 travels through the creasing zone B, the associated follower roller 135 on the upper end of lever 127 engages the lower camming edge of the arcuate cam plate 133. This depresses the lever 127 (rocking it counterclockwise as viewed in Fig. 8) and lifts links 124 and 129 to raise the inside clamp shoes 113 away from the spread bag body on the blades. These clamp shoes remain raised until a valve sleeve 9 is delivered to the bag body in valve sleeve delivery zone C. The outside clamp shoes 105, however, remain in clamping engagement with the spread bag body throughout the entire arc of travel in which the bag-spreading blades 22 are in their horizontal, bag-spreading position. Fig. 39 diagrammaticaly illustrates both the outside and inside clamp shoes 105 and 113 in clamping engagement with the spread bag body prior to engagement of roller 127 and cam 133. Fig. 40 diagrammatically illustrates the outside clamp shoes 105 in clamping engagement and the inside clamp shoes 113 raised after engagement of roller 127 and cam 133, and also illustrates the creasing dies 203 and 205 forming the crease X.

During the final 10° of forward rotation of the turret 24 in unison with carriage 19, the creaser carriage 191 is quickly returned to its inner retracted position of Fig. 14 by the action of fixed cam 237 upon stud 263, as previously described. This return is completed when the radial center line of the creaser carriage has swung through 43° of arc from its initial position R to its final position S. Return movement of the creaser carriage 191 to its inner retracted position conditions the means for moving the creaser carriage 191 (including latch 247, latch pin 253, etc.) for repeating the creasing cycle. The turret 24 is then quickly rotated backward (counterclockwise), due to reversal of rotation of gears 181 and 189 by cam 179, to its initial position with the radial center line of the creaser carriage 191 coincident with line R. The creasing device is then in position to repeat the creasing cycle upon the next spread bag body on the following bag-spreading device 21 as it travels into creasing zone B. Return of the turret 24 to its initial position also brings the radial center line of the valve sleeve delivery means 27 into its initial position T, wherein it is ready to deliver a valve sleeve 9 to the bag body 1 which has just been creased.

The bag spreader 21, carrying the creased spread bag body, now travels into the valve sleeve delivery zone C, with the inside clamp shoes 113 raised a substantial distance above the upper surface of the bag body. When the radial center line between the pair of blades 22 of the bag spreader comes into alignment with the radial center line of the valve sleeve delivery means 27 in the angular position connoted by line T, turret 24 again rotates forward (clockwise) in unison with the carriage 19, being driven by cam 179 and gears 181 and 189 as previously described.

Prior to such rotation of the turret, a valve sleeve 9 has been fed down the chute 305 by chains 315 and 349 on to the lower delivery end 303 of the chute. This sleeve lies centered on the delivery end 303 of the chute in position to be engaged by the fingers 395 of the reciprocating sleeve feeding device 301 and pushed off 303 onto the spread bag body as it travels through zone C.

As the turret 24 and the valve sleeve delivery means 27 rotate forward in unison with carriage 19, the radial center line of the delivery means remains aligned with the radial center line between the blades 22 of the bag spreader. The delivery carriage 381 moves radially outward from its initial inner retracted position of Fig. 19 as stud 401 travels around with the turret in the cam groove 403 in fixed cam plate 405. As delivery carriage 381 moves radially outward, trip lever 419 engages camming edge 431 of tripper 433 to raise fingers 395 to their vertical feeding position. The fingers then engage the rear edge of valve sleeve 9 and push it off the delivery end 303 of the chute and on to the spread bag body 1. The fingers move radially outward until they engage the edge of the extension 7, thus delivering the valve sleeve upon the spread bag body with the rear edge of the sleeve coincidental with the edge of extension 7, as illustrated in Fig. 41. The valve sleeve slides on to the upper surface of the spread bag body under the raised inside clamp shoes 113.

When the turret 24 has rotated forward through 43° of arc, thereby swinging the radial center line of valve sleeve delivery means 27 to its final position U, the valve sleeve delivery operation is completed. Just before the turret completes its forward movement, trip lever 419 engages stop 435 to pivot the feeding fingers 395 downward and retract them below the delivery end 303 of the chute 305. The turret then quickly rotates backward (counterclockwise) as previously described to its initial position wherein the radial center line of the delivery means 27 is coincident with line T. During this return movement of the turret, the delivery carriage 381 is driven radially inward to return it to its inner retracted position by the action of stud 401 in cam groove 403. The feeding fingers 395 are below the delivery end 303 of the chute during this return movement of the delivery carriage 381 so that another valve sleeve 9 may be fed down the chute on to its lower end 303 while the turret is returning to initial position.

It will be understood that a valve sleeve is delivered to a first bag body on one of the bag-spreading devices 21, as above described, while a creasing operation is being performed on a second spread bag body on the following bag-spreading device 21, as said devices are carried around by the cariage 19. The valve sleeve delivery operation and the creasing operation are performed simultaneously on both bag bodies in the course of a single oscillation of the turret.

As a bag spreader 21 travels out of valve sleeve delivery zone C, the associated follower roller 135 on lever 127 travels out from under the arcuate cam plate 133. The inside clamp shoes 113 are thereupon released to clamp the delivered valve sleeve 9 firmly in the assembled relation of Fig. 41 with the spread bag body 1, assuming that there is a bag body on the blades 22 of the bag spreader 21. If there is no bag body on the blades, the sleeve is clamped upon the bare upper surfaces of the blades.

The bag spreader 21 then travels under the bag detector 625. If, as usual, there is a bag body on the blades, the detector is prevented from dropping into the space between the blades since its lower end 627 is supported by the upper portion of the bag body spanning the space between the blades. No ejecting operation takes place. If, however, there is no bag body on the blades, the lower end 627 of the detector drops into the space between the blades. This causes the inside clamp shoes 113 to be raised and a blast of air to be delivered from nozzle 601 to eject the valve sleeve, as previously described.

The bag-spreading device 21 then carries the bag body extension 7 and the margin of the valve sleeve 9 which overlies the extension in an arcuate path between the needle 511 and the platen 513 of the sewing machine 31 (Fig. 27). The sewing machine, which is continuously driven, stitches the sleeve to the extension, forming the seam 11. This seam is arcuate because of the arcuate path of travel of the work being stitched. As the valve sleeve and extension travel beyond the needle, the sewing machine 31 stitches the strand 521, which extends in chord-like manner from the needle to the trailing end of the seam. Just after the trailing end of the seam 11 is carried past the shear blades 559 and 561, the lobe 579 of cam 575 engages valve-operating lever 577 to open valve 573. Compressed air is thereupon supplied through line 547 to cylinder 537 to actuate the shear blades to cut the strand 521, as previously described. When the lobe 579 rides off the lever 577, valve 573 vents the cylinder to atmosphere, whereupon the shear blades are retracted and opened.

The bag spreader 21, now carrying a completed valve bag body 1 with valve sleeve 9 affixed thereto, then enters operating zone E. The cam follower 89 associated with this bag spreader rides down the cam fall 99 of barrel cam 91 to the low track 95 of the cam. This actuates the cam-controlled linkage 75 for the bag spreader to swing its blades 22 upward and toward each other from their bag-spreading position of Figs. 3 and 8 back to their collapsed position of Figs. 4 and 9. As the blades return to collapsed position, the gusset sides 3 and 5 of the bag body re-fold, and the bag body is thus restored to the condition in which it was when originally placed on the blades. Both the outside and inside clamp shoes 105 and 113 are automatically released as the blades turn to vertical position, as previously described.

During the interval in which the blades 22 are returning to collapsed position, one of lugs 595, in rotating around with carriage 19, engages the tail of valve-operating lever 591 to open valve 587. Compressed air is thereupon supplied through pipe 585 to the nozzle 34 so that a blast of air is delivered downward upon the valve sleeve 9 thereunder. This air blast causes the sleeve to fold in with the gusset side 3 of the bag body, as illustrated in Fig. 44.

Finally, the bag spreader 21 carries the completed valve bag body into operating zone F. The blades 22 of the bag spreader are now wholly collapsed, the outside and inside clamp shoes 105 and 113 are released, and the completed valve bag body hangs loosely from the blades. An operator at zone F strips the bag body from the blades, as the final step in the operation on any one bag body. The bag spreader then re-enters through zone A, another bag body is placed thereon, and the entire series of operations repeated in a continuous manner.

It will be understood that the above-described operations are the same for each and every bag-spreading device 21 as it is carried around in its endless circular path by carriage 19. Thus, at any instant, five different bag bodies are being processed by the apparatus. With the five bag-spreading devices in the instantaneous positions illustrated in Fig. 47, the bag-spreading device designated I is in zone E and about to enter zone F where a completed valve bag body will be stripped therefrom. The next preceding bag-spreading device II is in zone D. The spread bag body thereon has already had its valve sleeve stitched thereto and cutter 32 is about to sever the trailing strand of stitching 521. The next preceding bag-spreading device III is just leaving valve sleeve delivery zone C, wherein a valve sleeve was delivered to the spread bag body thereon. The next preceding bag-spreading device IV is just leaving creasing zone B, wherein the spread bag body on this device was just previously creased. The next preceding bag-spreading device V is between zones A and B. It has had a bag body applied thereto in zone A and is about to carry the spread bag body into creasing zone B.

Thus, the apparatus of this invention is adapted automatically to manufacture valve bag bodies of the type illustrated in Fig. 45. Only a few and simple manual operations are required in operating the apparatus; placing bag bodies on the bag spreaders; placing valve sleeves on the table; and stripping completed valve bag bodies from the bag spreaders. All other steps are carried out automatically. It will be apparent that the apparatus may include more or less than five of the bag-spreading devices. The principles of the invention may even be embodied in an apparatus having only one bag-spreading device. While the apparatus is particularly adapted for operation upon gusseted bags, it will be apparent that it may operate upon ungusseted bags. In such case, the creasing device 23 and valve sleeve folding nozzle 33 would not be employed.

While the apparatus has been illustrated herein particularly as including means for stitching the valve sleeves to the bag bodies, it is contemplated that other means for affixing the sleeves to the bag bodies may be used. For example, the sleeves may be adhesively secured to the bag bodies, or stapled thereto, etc., within the concept of the invention.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A bag-spreading device comprising a pair of bag-spreading blades, each blade being pivoted for swinging movement on an axis substantially parallel to and offset from the plane of the blade, the axes of said blades being substantially parallel and spaced apart a distance somewhat greater than the sum of the distances by which the blades are offset from their respective axes, whereby said blades may be swung to a collapsed position wherein they are substantially parallel and closely adjacent each other and an expanded, bag-spreading position wherein they are substantially coplanar and relatively widely spaced.

2. A bag-spreading device as set forth in claim 1, further including clamping mechanism comprising a clamp movable toward and away from the blades for clamping a bag body on the blades when in bag-spreading position, and means whereby the clamp is automatically released when the blades are in collapsed position.

3. A bag-spreading device as set forth in claim 1, further including means associated with each blade for clamping a bag body thereon, each clamping means comprising a clamp shoe pivoted for swinging movement on the axis of the respective blade, means for biasing the clamp shoe to swing into engagement with the blade so that it moves with the blade as the latter swings toward its collapsed position, and stop means for limiting such swinging movement of the clamp shoe so that it stops moving prior to completion of movement of the blades to collapsed position, whereby said clamp shoes are released when the blades are in collapsed position.

4. In apparatus of the class described, a conveyor including a bag-spreading device movable therewith in a predetermined path, said device comprising bag-spreading means movable between a collapsed position for reception or stripping of a bag body and an expanded, bag-spreading position, means for maintaining said bag-spreading means in collapsed position as it travels through a first portion of said path and in bag-spreading position as it travels through a second portion of said path, a plurality of clamps mounted on the conveyor adapted to clamp a spread bag body on said bag-spreading means as it travels through the second portion of said path, all of said clamps being released when said bag-spreading means travels through the first portion of said path, and means for releasing certain of said clamps as said bag-spreading means travels through a fractional part of said second portion.

5. In apparatus of the class described, a rotatable carriage including a bag-spreading device movable therewith in a circular path, said device comprising bag-spreading means movable between a collapsed position for reception or stripping of a bag body and an expanded bag-spreading position, means for maintaining said bag-spreading means in collapsed position as it travels through a first arc of said path and in bag-spreading position as it travels through a second arc of said path, and means mounted on the carriage for clamping a spread bag body on said bag-spreading means as it travels through said second arc, said clamping means being controlled by said bag-spreading means to be released when the latter travels through said first arc.

6. In apparatus of the class described, a rotatable carriage including a bag-spreading device comprising bag-spreading means movable between a collapsed position for reception or stripping of a bag body and an expanded, bag-spreading position, means for maintaining said bag-spreading means in collapsed position as it travels through a first arc of said path and in bag-spreading position as it travels through a second arc of said path, first and second clamps mounted on the carriage for clamping a spread bag body on said bag-spreading means at points spaced from the mouth of the bag body and close to the mouth of the bag body, respectively, said clamps being controlled by said bag-spreading means to clamp the spread bag body as the bag-spreading means travels through said second arc and to release the spread bag body as the bag-spreading means travels through the first arc, and means for releasing said second clamp only as said bag-spreading means travels through a portion of said second arc.

7. In apparatus of the class described, a rotatable, generally annular carriage, a plurality of bag spreaders mounted on the carriage extending generally radially outward beyond the carriage from points within the carriage, outside clamp means mounted on the carriage for clamping spread bag bodies on said bag spreaders outside the carriage, and inside clamp means mounted on the carriage for clamping the spread bag bodies on said bag spreaders inside the carriage.

8. In apparatus of the class described, a rotatable generally annular carriage, a plurality of bag spreaders mounted on the carriage extending generally radially outward beyond the carriage from points within the carriage, said bag spreaders being movable with the carriage in a circular path, means located within the carriage for delivering valve sleeves on to spread bag bodies on said bag spreaders as they travel through a predetermined zone of said path, an outside clamp means mounted on the carriage for each bag spreader for clamping a spread bag body thereon outside the carriage, an inside clamp means mounted on the carriage for each bag spreader for clamping down upon a spread bag body thereon inside the carriage, and means for raising each inside clamp means as it travels through said zone to permit delivery of a valve sleeve to the spread bag body under said inside clamp means.

9. In apparatus for manufacturing gusset-side valve bags, a bag spreader adapted to spread the gusset sides of a bag body flat and being collapsible to permit the gusset sides to refold under their inherent tendency to do so, a nozzle positioned to direct a blast of air upon a valve sleeve fastened to one of said gusset sides, means including a valve for supplying air under pressure to said nozzle, and means operable in timed relation to the collapsing of said bag spreader for opening said valve as said bag spreader collapses and said gusset side re-folds to cause a blast of air to be directed upon said sleeve to fold it into said side.

10. Apparatus for manufacturing gusset-side valve bags, comprising a bag spreader adapted to spread the gusset sides of a bag body horizontally flat, means for moving the bag spreader to carry a spread bag body thereon in horizontal position through a predetermined path, means for delivering a valve sleeve upon the mouth end of the upper gusset side as the spread bag body travels through a portion of said path, means for affixing the valve sleeve to said upper gusset side as the spread bag body travels through a successive portion of said path, means for collapsing the bag spreader as it travels through a further successive portion of said path to permit the gusset sides to re-fold, and means for driving said sleeve into the upper gusset side at it refolds to cause the sleeve to fold in therewith.

11. Apparatus for manufacturing gusset-side valve bags, comprising a rotatable carriage, a bag spreader mounted on the carriage for movement therewith in a horizontal circular path, said bag spreader being adapted to spread the gusset sides of a bag body horizontally flat, means for delivering a valve sleeve upon the mouth end of the upper gusset side as the spread bag body travels through an arc of said path, means for affixing the sleeve to said upper gusset side as the spread bag body travels through a successive arc of said path, means for collapsing the bag spreader as it travels through a further successive arc of said path to permit the gusset sides to re-fold, and means for directing a blast of air upon the sleeve to drive it into the upper gusset side as it re-folds to cause the sleeve to fold in therewith.

12. Apparatus for manufacturing gusset-side valve bags, comprising a rotatable carriage, a plurality of bag spreaders mounted on the carriage for movement therewith in a horizontal circular path, each of said bag spreaders being adapted to spread the gusset sides of a bag body horizontally flat, a single means for delivering a valve sleeve upon the mouth end of the upper gusset side of a spread bag body carried on any one of said bag spreaders as it travels through a first arc of said path, a single means for affixing the sleeves to the upper gusset sides of the respective bag bodies as they travel through a second successive arc of said path, means for collapsing said bag spreaders as they travel through a third successive arc of said path to permit the gusset sides of the bag bodies to refold, a nozzle positioned to direct a blast of air downward upon the sleeves as the bag spreaders travel through said third arc, means including a valve for supplying air under pressure to said nozzle, and means operable in timed relation to the rotation of the carriage for opening said valve as a sleeve travels under the nozzle.

13. In apparatus of the class described, a bag spreader adapted to have a bag body placed thereon and to spread said bag body flat, means operative to deliver a valve sleeve to the bag spreader whether or not a bag body has been placed thereon, means for detecting the presence on or absence from the spreader of a bag body, and means controlled by said detector means for ejecting a valve sleeve from the bag spreader if no bag body has been previously placed thereon.

14. In apparatus of the class described, a bag spreader adapted to have a bag body placed thereon and to spread said bag body flat, means operative to deliver a valve sleeve to the bag spreader whether or not a bag body has been placed thereon, means for detecting the presence on or absence from the spreader of a bag body, and means for directing a blast of air upon a sleeve to eject it from the bag spreader, said air blast means being controlled by said detector means to operate if no bag body has been previously placed on the bag spreader.

15. In apparatus of the class described, a bag spreader adapted to have a bag body placed thereon and to spread said bag body flat, means operative to deliver a valve sleeve to the bag spreader whether or not a bag body has been placed thereon, means adapted to clamp the valve sleeve on the bag spreader, means for detecting the presence on or absence from the spreader of a bag body, and means controlled by said detector means for releasing said clamp means from the sleeve and for ejecting the sleeve from the bag spreader if no bag body has been previously placed thereon.

16. In apparatus of the class described, a bag spreader comprising a pair of blades movable from a collapsed bag-receiving position to an expanded bag-spreading position wherein they are parallel, horizontally coplanar and laterally spaced to spread flat a bag body, means operative to deliver a valve sleeve upon the blades in position spanning the blades whether or not a bag body has been placed thereon, a detector including a feeler adapted normally to be supported in raised position by a spread bag body but to drop into the space between said blades if there is no bag body thereon, and means controlled by said detector for ejecting a valve sleeve from said blades when said feeler drops into the space between the blades.

17. In apparatus of the class described, a bag spreader comprising a pair of blades movable from a collapsed bag-receiving position to an expanded bag-spreading position wherein they are parallel, horizontally coplanar and laterally spaced to spread flat a bag body, means operative to deliver a valve sleeve upon the blades in position spanning the blades whether or not a bag body has been placed thereon, a detector including a feeler adapted normally to be supported in raised position by a spread bag body but to drop into the space between said blades if there is no bag body thereon, and means for directing a downward blast of air upon the portion of the sleeve spanning the space between the blades to blow the sleeve downward off the blades, said air blast means being controlled by said detector to operate when said feeler drops into the space between the blades.

18. In apparatus of the class described, a bag spreader comprising a pair of blades movable from a collapsed bag-receiving position to an expanded bag-spreading position wherein they are parallel, horizontally coplanar, and laterally spaced to spread flat a bag body, means operative to deliver a valve sleeve upon the blades in position spanning the blades whether or not a bag body has been placed thereon, means adapted to clamp the valve sleeve on the blades, a detector including a feeler adapted normally to be supported in raised position by a spread bag body but to drop into the space between the blades if there is no bag body thereon, and means controlled by said detector for releasing said clamp means from the sleeve and for ejecting the valve sleeve from said blades when said feeler drops into the space between the blades.

19. Apparatus for manufacturing valve bags comprising a rotatable carriage including a bag spreader movable therewith in a circular path, means for maintaining said bag spreader expanded throughout an arc of said path and collapsed substantially throughout the remainder, means for delivering a valve sleeve to said bag spreader as it travels through a portion of said arc, means for ejecting a valve sleeve from said bag spreader if there is no bag thereon as it travels through a successive portion of said arc, and means for affixing a sleeve to a bag on said bag spreader as it travels through a further successive portion of said arc.

20. In apparatus of the class described, a bag spreader, means for moving said bag spreader to carry a spread bag body thereon in a predetermined path, a movably mounted creasing device adapted to form a valve flap crease in said spread bag body as it travels through a portion of said path, means for moving said creasing device forward in unison with the bag spreader as it travels through said portion, and means for moving said creasing device from a retracted position laterally removed from said path to a creasing position with respect to said spread bag body, then back to retracted position, as it travels forward in unison with the bag spreader.

21. In apparatus of the class described, a rotatable carriage including a bag spreader for moving a spread bag body on the bag spreader in a circular path, a creasing device adapted to form a valve flap crease in said spread bag body, said creasing device being mounted for oscillation on the axis of the carriage and for reciprocation radially of the carriage toward and away from the bag spreader, means for rotating said creasing device forward in unison with said bag spreader as it travels through an arc of said path and then back to the initial point of said arc, and means for driving said creasing device radially toward said path, for causing it to dwell in a creasing position with respect to said bag body, and for subsequently driving it radially away from said path, as it rotates forward in unison with said bag spreader.

22. In apparatus of the class described, a rotatable carriage including a bag spreader for moving a spread bag body on the bag spreader in a circular path, a valve sleeve delivery means for delivering a valve sleeve to said spread bag body as it travels in said path, said delivery means being mounted for oscillation on the axis of said carriage, and means for rotating the delivery means forward in unison with the bag spreader from an initial position during valve sleeve delivery, then back to initial position.

23. In apparatus as set forth in claim 22, said valve sleeve delivery means including a sleeve feeder mounted for reciprocation radially with respect to the carriage, and means for driving said sleeve feeder radially toward said bag spreader as the delivery means rotates forward in unison therewith to feed a sleeve to said spread bag body, and for driving said sleeve feeder radially away from said bag spreader as said delivery means rotates back to its initial position.

24. Apparatus as set forth in claim 23, further including means for retracting said sleeve feeder from feeding position with respect to said delivery means during its radial movement away from the bag spreader to permit another sleeve to be deposited upon said delivery means.

25. In apparatus of the class described, a generally annular rotary carriage, a plurality of bag spreaders mounted on and extending radially outward from the carriage at equally spaced angular intervals therearound, a turret mounted for oscillation on the axis of and within the carriage, a creasing device carried by the turret and adapted to form a valve flap crease in a spread bag body on any one bag spreader as it is rotated by the carriage, and means for oscillating said turret a number of times equal to the number of bag spreaders during each revolution of the carriage.

26. In apparatus of the class described, a generally annular rotary carriage, a plurality of bag spreaders mounted on and extending radially outward from the carriage at equally spaced angular intervals therearound, a turret mounted for oscillation on the axis of and within the carriage, a valve sleeve delivery means carried by the turret for delivering a valve sleeve to any one bag spreader as it is rotated by the carriage, and means for oscillating said turret a number of times equal to the number of bag spreaders during each revolution of the carriage.

27. In apparatus as described in claim 26, valve sleeve feeding means mounted in fixed relation to said carriage for feeding valve sleeves one by one to the turret, and valve sleeve feeding means on the turret for feeding valve sleeves one by one to the valve sleeve delivery means.

28. In apparatus of the class described, a generally annular rotary carriage, a plurality of bag spreaders mounted on and extending radially outward from the carriage at equally spaced angular intervals therearound, a turret mounted for oscillation on the axis of and within the carriage, a creasing device carried by the turret for forming a valve flap crease in a bag body on each bag spreader, a valve sleeve delivery means for delivering a valve sleeve to each bag spreader, said delivery means being mounted on the turret and angularly spaced ahead of the creasing device an angle corresponding to the angular spacing of the bag spreaders, and means for oscillating said turret a number of times equal to the number of bag spreaders during each revolution of the carriage.

29. Apparatus for applying valve sleeves to normally flat tubular bag blanks, comprising normally-vertical spreaders for the reception of flat bag blanks in vertical planes, means for translating said spreaders through a closed path, means for successively initially moving said spreaders into substantially horizontal planes to spread corners of supported blanks horizontally, oscillating means temporarily movable with successive spreaders adapted successively to apply valve sleeves flatwise on the flat corners, means for clamping the corner and the sleeve as each spreader moves on, and means adapted to be passed by the clamped corner and sleeve and adapted permanently to fasten them together as they pass the last-named means.

30. Apparatus for applying valve sleeves to normally flat tubular and gusseted bag blanks, comprising normally-vertical spreaders for the reception of flat bag blanks in vertical planes, means for moving said spreaders through a circular closed path, means for successively initially moving said spreaders into substantially horizontal planes to spread corners of supported blanks horizontally, oscillating means movable temporarily with successive spreaders adapted successively to apply valve sleeves flatwise on the flat corners, means for clamping the corner and the sleeve as each spreader moves on, and sewing means adapted to be passed by the horizontal clamped corner and sleeve and adapted to stitch them as they pass the last-named means, the stitched seam being arcuate in view of said circular movement.

31. Apparatus for applying valve sleeves to normally flat tubular bag blanks, comprising normally-vertical spreaders for the reception of flat bag blanks in vertical planes, means for translating said spreaders through a closed path, means for successively initially moving said spreaders into substantially horizontal planes to spread corners of supported blanks horizontally, oscillating means temporarily movable with successive spreaders adapted successively to apply valve sleeves flatwise on the flat corners, means for clamping the corner and the sleeve as each spreader moves on, and means for releasing the clamping means and returning the spreaders to their initial vertical planes again to flatten the blanks vertically.

32. Apparatus for applying valve sleeves to normally flat tubular and gusseted bag blanks, comprising normally-vertical spreaders for the reception of flat bag blanks in vertical planes, means for moving said spreaders through a circular closed path, means for successively initially moving said spreaders into substantially horizontal planes to spread corners of supported blanks horizontally, oscillating means movable temporarily with successive spreaders adapted successively to apply valve sleeves flatwise on the flat corners, means for clamping the corner and the sleeve as each spreader moves on, and sewing means adapted to be passed by the horizontal clamped corner and sleeve and adapted to stitch them as they pass the last-named means, the stitched seam being arcuate in view of said circular movement, means for releasing the clamping means and returning the spreaders to their initial vertical planes again to flatten the blanks, and means for reforming the gussets in the flattened portions of the bag blanks including means for folding therein the applied sleeves.

33. Apparatus for manufacturing valve bags comprising a bag-spreading device including bag body engaging elements adapted to carry a bag body and movable to spread the corner of the bag body flat, fastening mechanism for affixing a valve sleeve to the spread corner of a bag body carried by said device, said bag-spreading device and fastening mechanism being mounted for relative movement into cooperative relation to affix a sleeve to the bag body and out of cooperative relation to permit application of a sleeve to the spread corner of a bag body spread by the bag-spreading device, and valve sleeve feeding mechanism for delivering a sleeve to the spread corner of a bag body spread by the bag-spreading device while the latter and the fastening mechanism are out of cooperative relation.

34. Apparatus for manufacturing valve bags comprising a bag-spreading device including bag body engaging elements adapted to carry a bag body and movable to spread the corner of the bag body flat, a sewing machine for stitching a valve sleeve to the spread corner of a bag carried by said device, said bag-spreading device and sewing machine being mounted for relative movement into cooperative relation for stitching a sleeve to the bag body and out of cooperative relation to permit application of a sleeve to the spread corner of a bag body spread by the bag-spreading device, and valve sleeve feeding mechanism for delivering a sleeve to the spread corner of a bag body spread by the bag-spreading device while the latter and the sewing machine are out of cooperative relation.

35. Apparatus for manufacturing valve bags comprising a bag spreading device including bag body engaging elements adapted to carry a bag body and movable to spread the corner of the bag body flat, a sewing machine for stitching a valve sleeve to the spread corner of a bag body carried by said device, said bag-spreading device and sewing machine being mounted for relative rotation into cooperative relation for stitching a sleeve to the bag body with an arcuate seam and out of cooperative relation to permit application of a sleeve to the spread corner of a bag body spread by the bag-spreading device, and valve sleeve feeding mechanism for delivering a sleeve to the spread corner of a bag body spread by the bag-spreading device while the latter and the sewing machine are out of cooperative relation.

36. In apparatus of the class described, a rotatable carriage, a plurality of bag-spreading devices carried by the carriage at spaced intervals around the carriage and extending radially outward therefrom, each said device comprising a pair of bag-spreading blades, each blade being pivoted for swinging movement on an axis substantially parallel to and offset from the plane of the blade and extending generally radially with respect to the carriage, the axes of said blades of said pair being substantially parallel and spaced apart a distance somewhat greater than the sum of the distances by which the blades are offset from their respective axes, whereby said blades may be swung to a collapsed position wherein they are substantially parallel and closely adjacent each other in planes substantially radial with respect to the carriage and to an expanded, bag-spreading position wherein they are substantially coplanar in a plane normal to the rotary axis of the carriage and relatively widely spaced.

37. Apparatus as set forth in claim 36, further including cam-controlled mechanism for maintaining the blades of each bag-spreading device in collapsed position as they travel with the carriage through a part of one revolution thereof and for maintaining them in bag-spreading position as they travel through the remainder of a revolution.

38. Apparatus as set forth in claim 36, further including a cam-controlled linkage for actuating each pair of blades, and a single fixed cam cooperable with all of said linkages and adapted to control said linkages to maintain each pair of blades in collapsed position as they travel with the carriage through a part of one revolution thereof and to maintain them in bag-spreading position as they travel through the remainder of a revolution.

DANIEL BELCHER.
RUSSELL J. WILLIAMS.
JAMES E. VOEGE.

REFERENCES CITED

The following references are of record in the file of this patent:

UNITED STATES PATENTS

| Number | Name | Date |
|---|---|---|
| 331,721 | Lorenz et al. | Dec. 1, 1885 |
| 1,646,572 | Burgdorf | Oct. 25, 1927 |
| 1,780,720 | Redington | Nov. 4, 1930 |
| 2,010,994 | Irmscher | Aug. 13, 1935 |
| 2,102,767 | Tooker | Dec. 21, 1937 |
| 2,125,308 | Novick | Aug. 2, 1938 |
| 2,250,699 | Bischoff | July 29, 1941 |
| 2,260,191 | Orr | Oct. 21, 1941 |
| 2,277,289 | Bergstein | May 24, 1942 |
| 2,387,274 | Lee | Oct. 23, 1945 |
| 2,415,862 | Belcher | Feb. 18, 1947 |
| 2,442,431 | Peters et al. | June 1, 1948 |